United States Patent
Song et al.

(10) Patent No.: US 12,163,860 B1
(45) Date of Patent: Dec. 10, 2024

(54) METHODS FOR STRUCTURAL DAMAGE MONITORING FOR WHOLE-MACHINE LIFE TEST OF SMALL TURBOSHAFT ENGINES

(71) Applicant: NANJING UNIVERSITY OF AERONAUTICS AND ASTRONAUTICS, Jiangsu (CN)

(72) Inventors: Yingdong Song, Nanjing (CN); Xu Zhao, Nanjing (CN); Mofei Chen, Nanjing (CN); Xuming Niu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/811,733

(22) Filed: Aug. 21, 2024

(30) Foreign Application Priority Data

Aug. 31, 2023 (CN) .......................... 202311111711.1

(51) Int. Cl.
*G01M 15/14* (2006.01)
*F01D 21/00* (2006.01)

(52) U.S. Cl.
CPC ........... *G01M 15/14* (2013.01); *F01D 21/003* (2013.01); *F05D 2260/80* (2013.01); *F05D 2260/83* (2013.01)

(58) Field of Classification Search
CPC .. G01M 15/14; F01D 21/003; F05D 2260/80; F05D 2260/83
See application file for complete search history.

(56) References Cited

U.S. PATENT DOCUMENTS

| | | | |
|---|---|---|---|
| 6,871,160 B2 * | 3/2005 | Jaw ....................... | G01M 15/00 702/182 |
| 2011/0137575 A1 * | 6/2011 | Koul ................... | G05B 23/0245 702/34 |
| 2021/0131914 A1 | 5/2021 | Ma et al. | |

FOREIGN PATENT DOCUMENTS

| | | |
|---|---|---|
| CN | 107247002 A | 10/2017 |
| CN | 109885920 A | 6/2019 |

(Continued)

OTHER PUBLICATIONS

Notification to Grant Patent Right for Invention in Chinese Application No. 202311111711.1 mailed on Feb. 23, 2024, 7 pages.

*Primary Examiner* — Eric S. McCall
*Assistant Examiner* — Timothy P Graves
(74) *Attorney, Agent, or Firm* — PORUS IP LLC

(57) ABSTRACT

Disclosed is a method for structural damage monitoring for whole-machine life test of small turboshaft engine, comprising: determining a failure mode based on load borne by typical components of the small turboshaft engine in a service process and common failure forms, screening a structural damage index of a non-major component based on a coupling relationship between structural damages, selecting a destructive damage of components in the small turboshaft engine and an indirect damage causing changes in material properties of key component, planning a structural damage monitoring means based on the failure mode, the structural damage index, the destructive damage, and the indirect damage, designing an accelerated mission test platform of the small turboshaft engine, and designing a torque automatic loading scheme of an eddy current dynamometer, and testing the small turboshaft engine, and performing damage monitoring of the small turboshaft engine based on the planned structural damage monitoring means.

8 Claims, 11 Drawing Sheets

(56) References Cited

FOREIGN PATENT DOCUMENTS

| | | |
|---|---|---|
| CN | 113390645 A | 9/2021 |
| CN | 115014781 A | 9/2022 |
| CN | 115356121 A | 11/2022 |
| CN | 115406664 A | 11/2022 |
| CN | 115640666 A | 1/2023 |
| CN | 115859795 A | 3/2023 |
| JP | 2021081217 A | 5/2021 |
| WO | 2015052274 A1 | 4/2015 |

\* cited by examiner

100

┌─ 110
Determining a failure mode based on the load borne by typical components of a small turboshaft engine in a service process and common failure forms

↓

┌─ 120
Screening the structural damage index of the non-major component based on the coupling relationship between the structural damages

↓

┌─ 130
Selecting destructive damage to components occurring in the small turboshaft engine and indirect damage causing changes in the material properties of a key component

↓

┌─ 140
Planning a structural damage monitoring means based on the failure mode, the structural damage index of the non-major component, the destructive damage, and the indirect damage

↓

┌─ 150
Designing an accelerated mission test platform of a small turboshaft engine, and the torque automatic loading scheme of the eddy current dynamometer based on the properties of the eddy-current dynamometer of the accelerated mission test platform and the small turboshaft engine as the experimental carrier

↓

┌─ 160
Testing the small turboshaft engine, and performing damage monitoring on the small turboshaft engine based on the planned structural damage monitoring means

FIG. 1

METHODS FOR STRUCTURAL DAMAGE MONITORING FOR WHOLE-MACHINE LIFE TEST OF SMALL TURBOSHAFT ENGINES

CROSS-REFERENCE TO RELATED APPLICATIONS

This application claims priority to Chinese Patent Application No. 202311111711.1, filed on Aug. 31, 2023, the contents of which are hereby incorporated by reference to its entirety.

TECHNICAL FIELD

The present disclosure relates to the field of engine testing, and in particular, to a method and a system for structural damage monitoring for a whole-machine life test of a small turboshaft engine.

BACKGROUND

Accelerated mission test (AMT) is a test conducted to early expose structural failures and defects that may occur when the engine is tested on a ground test bench in the field. The accelerated mission test causes the engine to perform on the ground test bench according to a pre-established accelerated mission test cycle that adequately reflects the usage situation in the field. At present, a verification test of the accelerated mission test mainly focuses on blade simulation test piece. By conducting creep-fatigue interaction tests on test pieces of the same material used in the engine turbine disk, the test pieces are subjected to damage equivalent verification under original rotational speed spectrum and acceleration spectrum obtained through the engine simulation tasks.

Although the simulation test may clearly analyze stresses and observe damage of critical components, it ignores complex operating environment of engines (e.g., aero-engines) in actual service during the process. In addition, after applying an acceleration load to the gas turbine of the engine, the damage patterns of other components on the engine, except for the gas turbine, under the load deviate greatly from the actual situation. In order to ensure the reliability of the accelerated mission test theory, it is necessary to assess the damage pattern of the engine in the whole engine environment to complete the verification.

Therefore, it is necessary to provide a method for structural damage monitoring for a whole-machine life test of a small turboshaft engine, which can simulate the load and damage condition of the engine according to the actual situation of the engine in the service process, to ensure that the whole experimental process on the engine is more stable and accurate.

SUMMARY

In order to solve the above problems, the present disclosure provides a method for structural damage monitoring for a whole-machine life test of a small turboshaft engine, which is capable of monitoring the health status of the engine in an efficient means.

One or more embodiments of the present disclosure provide a method for monitoring structural damage for a whole-engine life test of a small turboshaft engine. The method may include: determining a failure mode based on a load borne by typical components of the small turboshaft engine in a service process and common failure forms, the common failure forms including blade fatigue fracture and blade elongation; screening a structural damage index of a non-major component based on a coupling relationship between structural damages, the structural damage index of the non-major component representing a current health status of the small turboshaft engine; selecting a destructive damage of components in the small turboshaft engine and an indirect damage causing changes in material properties of a key component; planning a structural damage monitoring means based on the failure mode, the structural damage index of the non-major component, the destructive damage, and the indirect damage; designing an accelerated mission test platform of the small turboshaft engine, and designing a torque automatic loading scheme of an eddy current dynamometer based on properties of the eddy-current dynamometer of the accelerated mission test platform and the small turboshaft engine as an experimental carrier; and testing the small turboshaft engine, and performing damage monitoring of the small turboshaft engine based on the planned structural damage monitoring means.

In some embodiments, the failure mode may include blade radial elongation, fatigue fracture, reverse torsion, pitting, ablative, and surface roughness change caused by load, thermal shock, and surface particle erosion.

In some embodiments, the screening of the structural damage index of the non-major component may depend on whether the structural damage is coupled with a creep deformation of a gas turbine, the structural damage index may include structural damage of a gas turbine combustion chamber, structural damage of a gas turbine guide, and structural damage of the power turbine that affects a working condition of the gas turbine.

In some embodiments, the destructive damage may include a crack length of the gas turbine, a crack length of the gas turbine guide, a crack length of the main combustion control of the gas turbine combustion chamber, and a blade creep elongation of the power turbine; the indirect damage may include a blade ablation degree of the gas turbine, a blade surface roughness of the gas turbine, an ablation degree of the gas turbine guide, an ablation degree of the main combustion control of the gas turbine combustion chamber, and a surrounding surface roughness of the main combustion control of the gas turbine combustion chamber.

In some embodiments, the structural damage monitoring means may include: for cracks produced in the service process, using a fluorescent penetration detection technology to detect surface opening defect; using a CT scanning technology to detect internal defects of components; using a radial clearance measurement, a three-dimensional scanning, and a three-dimensional coordinate method to detect a blade creep deformation of the gas turbine; using a microscope to observe pitting and ablative damage of a gas turbine blade caused by high temperature and high-pressure environment; and for the surface roughness, complexing a measured surface first by using complex gel, and then detecting a roughness of the complexed observable surface.

In some embodiments, an accelerated mission test platform may include a test workshop and an engine fuel system, a control system, a data acquisition system, a test bench, an eddy current dynamometer, an electrical system, and an air intake and exhaust system arranged in the test workshop; the engine fuel system may be configured to provide fuel for a test engine; the control system may be configured to control the test engine; the data acquisition system may be configured to collect and record test parameters; the test bench may be configured to mount the test engine; the eddy current dynamometer may be configured to absorb and measure a shaft power output of the test engine, and the eddy current dynamometer may have a function of load adjustment; the electrical system may be configured to supply power to each system in the test workshop; and the air intake and exhaust system may be configured to supply air to the test engine and provide an exhaust channel.

Beneficial effects of embodiments of the present disclosure may include considering the interaction effects between structural damages in the test process, combining the engine principle, determining the structural damage parameters to be detected, which can facilitate disassembly of the engine and nondestructive testing in each work cycle, and designing the accelerated mission test platform of the turboshaft engine. At the same time, with the principle of accelerated mission test as the benchmark, the monitoring of the health state of the engine can be realized in an efficient way through the acceleration mission test platform of the turboshaft engine and the planned structural damage monitoring scheme.

BRIEF DESCRIPTION OF THE DRAWINGS

The Present Disclosure is Further Illustrated by Way of Exemplary Embodiments, which is Described in Detail by Means of the Accompanying Drawings. These Embodiments are not Limiting, and in these Embodiments, the Same Numbering Denotes the Same Structure, Wherein:

FIG. 1 is an exemplary flowchart illustrating a process of a method for structural damage monitoring for a whole-machine life test of a small turboshaft engine according to some embodiments of the present disclosure;

DETAILED DESCRIPTION

Figure 2:
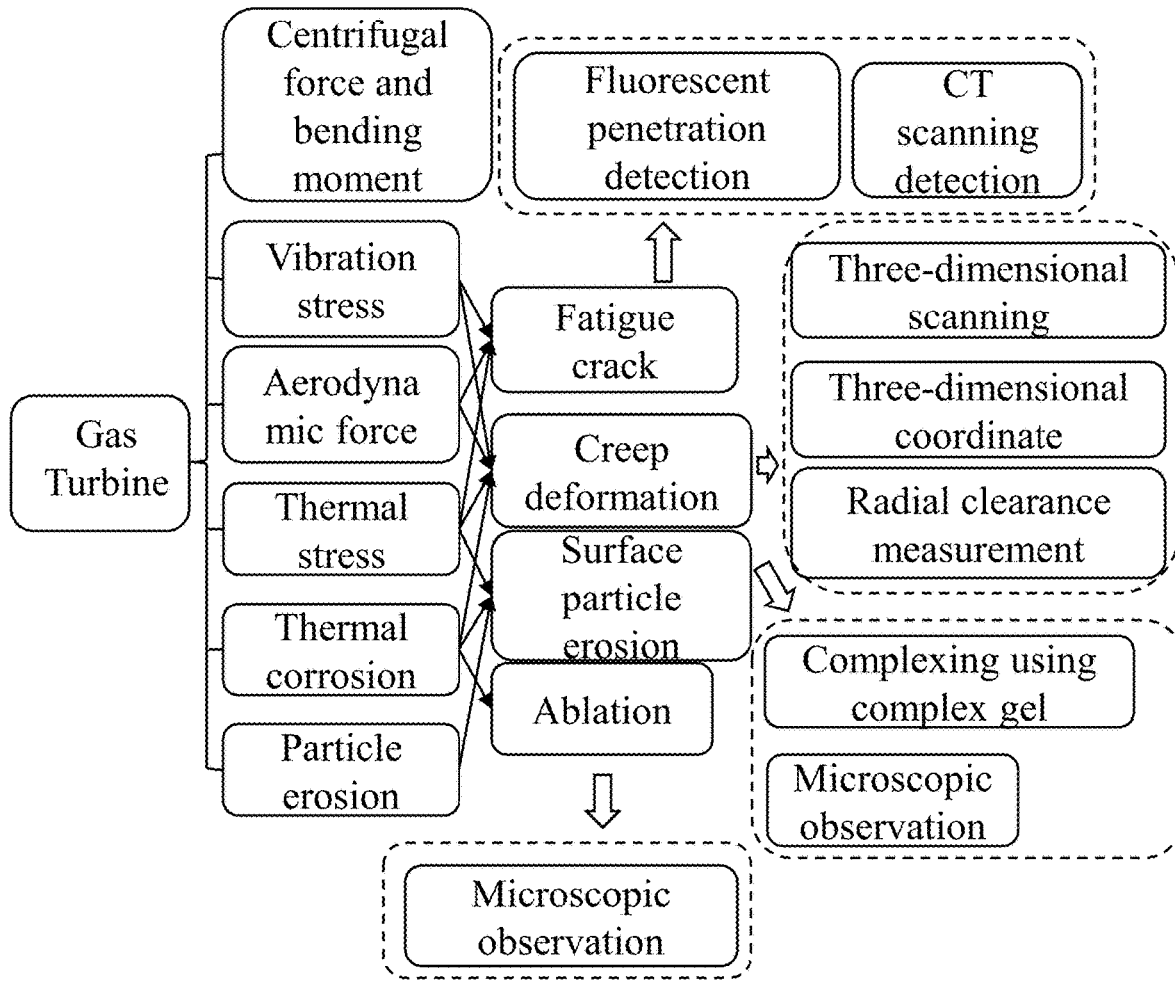
FIG. 2 is an exemplary schematic diagram illustrating structural damage monitoring means according to some embodiments of the present disclosure.

In order to more clearly illustrate the technical solutions of the embodiments of the present disclosure, the accompanying drawings, which are required to be used in the description of the embodiments, are briefly described below. The accompanying drawings do not represent the entirety of the embodiments.

It should be understood that as used herein, the terms "system", "device", "unit", and/or "module" are a way to distinguish between different components, elements, parts, sections, or assemblies at different levels. The words may be replaced by other expressions if other words accomplish the same purpose.

As shown in the present disclosure and the claims, unless the context clearly suggests an exception, the words "a", "one", "an" and/or "the" do not refer specifically to the singular, but also include the plural. Generally, the terms "including" and "comprising" suggest only the inclusion of clearly identified steps and elements that do not constitute an exclusive list. The method or apparatus may also include other steps or elements.

When describing the operations performed in the embodiments of the present disclosure in step-by-step, the order of the steps is all interchangeable if not otherwise indicated, the steps may be omitted, and other steps may be included in the process of operation.

FIG. 1 is an exemplary flowchart illustrating a process of a method for structural damage monitoring for a whole-machine life test of a small turboshaft engine according to some embodiments of the present disclosure. In some embodiments, a process 100 is executed by a processor.

In some embodiments, the processor may process data and/or information obtained from other devices/components or constituent parts. The processor may execute program instructions based on such data, information, and/or processing results to perform one or more of the functions described in embodiments of the present disclosure. By way of example only, the processor may include a central processing unit (CPU), an application-specific integrated circuit (ASIC), or the like, or any combination of the above. In some embodiments, the processor may include a plurality of modules and the different modules may be used to execute separate program instructions.

As shown in FIG. 1, the process 100 includes the following operations:

In operation 110, a failure mode is determined based on the load borne by typical components of a small turboshaft engine in a service process and common failure forms.

In some embodiments, the body structure of the turboshaft engine may include at least one of an exhaust device, a turbine, a combustion chamber, a pressurizer, an intake device, or the like. In some embodiments, the small turboshaft engine is a turboshaft engine with a small body size, which may be referred to as an engine in the present disclosure.

The typical components are components that are susceptible during the service process. The service process is a normal use process of a turboshaft engine.

In some embodiments, the typical components of the small turboshaft engine may include at least one of a compressor blade, a compressor rotor, a turbine blade (e.g., the turbine blade of a gas turbine, a turbine blade of a power turbine, or the like), a turbine rotor (e.g., a turbine rotor of the gas turbine, a turbine rotor of the power turbine, or the like), a combustion chamber, a gearbox, bearings, a drive shaft, etc.

In some embodiments, the load borne by the typical components of the small turboshaft engine may include at least one of mechanical load, aerodynamic load, thermal load, vibrational load, environmental load, etc.

The mechanical load is stress and a strain state generated by an object after being subjected to force. In some embodiments, the mechanical load may include centrifugal force generated by rotating components (e.g., the compressor blades, the compressor rotors, the turbine blades, and the turbine rotors, or the like) during high-speed rotation, and bending and shear forces generated by bearings and gearboxes when transmitting torque.

The aerodynamic load is the force or moment generated by the interaction of airflow and an object. In some embodiments, the aerodynamic load may include the load resulting from uneven distribution of impact force and pressure generated by the airflow passing through the compressor and turbine.

The thermal load is the thermal stress caused by the thermal expansion of the component such as the turbine when high temperature and high-pressure gases generated by combustion pass through the component.

The vibrational load is alternating stress resulting from mechanical vibration and aerodynamic vibration generated during engine operation. Under the prolonged action of the alternating stress, the components may experience the phenomenon of fatigue damage.

The environmental load is the force or load on the engine caused by surrounding environmental factors. In some embodiments, the environmental load may include the effects of environmental factors such as external temperature, humidity, atmospheric pressure, etc. on the typical components, and the corrosion effects of corrosive gases, particulates, etc. on the typical components.

In some embodiments, the processor may obtain the operational data of the small turboshaft engine in the service process and determine the load borne by the typical components of the small turboshaft engine. For example, the operational data may include the gas turbine speed, the power turbine rotational speed, the total pressure at the outlet of the compressor, the atmospheric humidity, the engine vibration, the atmospheric pressure, the gas turbine inlet temperature, the power turbine inlet temperature, the exhaust temperature, the turbine disk real-time temperature, the output power, the fuel flow, the control volume, or other relevant data during engine operation.

The common failure forms are failure forms in which the failures occur for a high number of times during the service process of the small turboshaft engine. For example, the common failure form may be a failure form in which the failure occurs at a frequency more than a predetermined frequency threshold. In some embodiments, the common failure forms of the small turboshaft engine may include phenomena such as blade fatigue fracture and blade elongation.

In some embodiments, the blade fatigue fracture may be a sudden fracture of a blade (e.g., the compressor blade, the turbine blade, etc.) due to the accumulation of fatigue damage inside the material to a certain extent after the blade under cyclic loads (e.g., the aerodynamic load and the vibrational load) operates for a long time period. The blade fatigue fracture affects the safety and reliability of the engine.

In some embodiments, the blade elongation may be a gradual increase in the length of a blade (e.g., the compressor blade, the turbine blade, etc.) due to creep phenomena of the material under the action of the mechanical load and the thermal load in a high-temperature and high-pressure environment. For example, the blade elongation may be the blade radial elongation. Creep is the slow plastic deformation of solid material under long-term constant stress. The blade elongation affects the aerodynamic performance and efficiency of the engine.

In some embodiments, the processor may obtain the operational data of the small turboshaft engine in the service process, obtain all failure forms in which failures of the small turboshaft engine have occurred in the service process, and identify the failure forms of the failures with a frequency greater than the frequency threshold as the common failure forms of the small turboshaft engine. The frequency threshold may be set manually or empirically.

In some embodiments, the failure mode may include the expression manner of the typical components of an engine losing its original functionality and its cause, or the expression manner of the performance of the typical components deteriorating to not function correctly, and its cause. For example, the failure mode may include a turbine blade failure caused by a combination of creep-fatigue interaction and creep damage.

In some embodiments, the failure mode may include the blade radial elongation, the fatigue fracture, reverse torsion, pitting, ablation, and a surface roughness change due to the load, thermal shock, and surface particle erosion.

In some embodiments, the failure mode may include phenomena such as the blade radial elongation due to the load scouring, the fatigue fracture, and the reverse torsion. For example, the blade is subjected to scouring by the load (e.g., the aerodynamic load) while to scouring by solid particles in the gas, and under such the scouring of the aerodynamic load over a long period of time, the blade radial elongation may occur. As another example, under the combined effect of an alternating mechanical load (e.g., the vibrational load) and solid particles in the gas, the blade fatigue fracture may occur within the blade and expand over time, and the blade may ultimately fracture. As another example, the blade may undergo complex deformation (e.g., torsion, the reverse torsion, or the like) when subjected to the cross action of various loads. The reverse torsion is a reverse torsion type of rebound that occurs when an object produces a torsional type of deformation under a pair of torques and then removes the external torque.

In some embodiments, the failure mode may include phenomena such as the pitting and the ablation caused by the thermal shock scouring. For example, during engine startup or rapid acceleration, the turbine blades experience a sharp temperature increase and the thermal shock scouring, which may result in the formation of the point like pits (pitting) in certain areas of the blade surface due to oxidative corrosion, while the oxidizing components in the high-temperature gas further react with the blade material, resulting in the loss of surface material (the ablation). The thermal shock refers to a phenomenon in which an object undergoes a large amount of heat exchange and a dramatic temperature change in a relatively short period of time due to rapid heating or cooling, resulting in the generation of shock thermal stress. Pitting refers to the phenomenon of the point like pits occurred on the surface of the blade under the combined effect of the thermal shock and scouring, and the point like pits may be formed by the localized corrosion of the blade. The ablation refers to the phenomenon of melting, disappearance, and deformation of the surface material of a moving object with a very high velocity under the action of incandescent gas.

In some embodiments, the failure mode may include phenomena such as the surface roughness change due to the surface particle erosion. For example, under a prolonged surface particle erosion, the surface of the blade may become rough and uneven, with a consequent increase in surface roughness. The surface particle erosion is a phenomenon of liquid/solid two-phase flow scouring corrosion being constituted when solid-phase particles are mixed with the liquid flow. Surface roughness is a parameter, e.g., a percentage parameter, used to measure the height and spacing of tiny peaks and valleys on a material surface.

In some embodiments, the processor may determine the failure mode of the small turboshaft engine based on the load borne by the typical components of the small turboshaft engine and the common failure forms. For example, the processor may query a cross-reference table to determine the failure mode based on the load borne by the typical components of the small turboshaft engine and the common failure forms.

In some embodiments, the cross-reference table may be determined based on manual experience. For example, the cross-reference table may include a corresponding relationship between different combinations of load information (including the load type and load size) and the common failure forms and different failure modes.

In operation 120, the structural damage index of the non-major component is screened based on the coupling relationship between the structural damages.

The coupling relationship between structural damages refers to the mutual influence relationship between the structural damages of different components inside the engine. If there is a coupling relationship between the structural damages of two components, it means that the damage of one component may cause the damage of the other component. For example, if there is a coupling relationship between a compressor blade and bearing of an engine, it means that damage to the blade may cause damage to the bearing. When damage occurs to a compressor blade, its vibration characteristic may change, resulting in change in the load and vibration excitation transmitted to the bearing, which may lead to damage to the bearing (e.g., accelerating the wear process of the bearing and shortening its service life). In this case, there is a coupling relationship between the structural damage of the blade and the structural damage of the bearing.

In some embodiments, the processor may determine the coupling relationship between different components within the engine based on user input or historical data.

The non-major components are components of the engine that are not the most important in terms of function or safety. For example, the non-major component may include one or more of a bearing, a gearbox, a gas turbine combustion chamber, a gas turbine guide, a power turbine, or the like.

In some embodiments, the non-major component of the engine may be determined based on manual experience.

Figure 3:
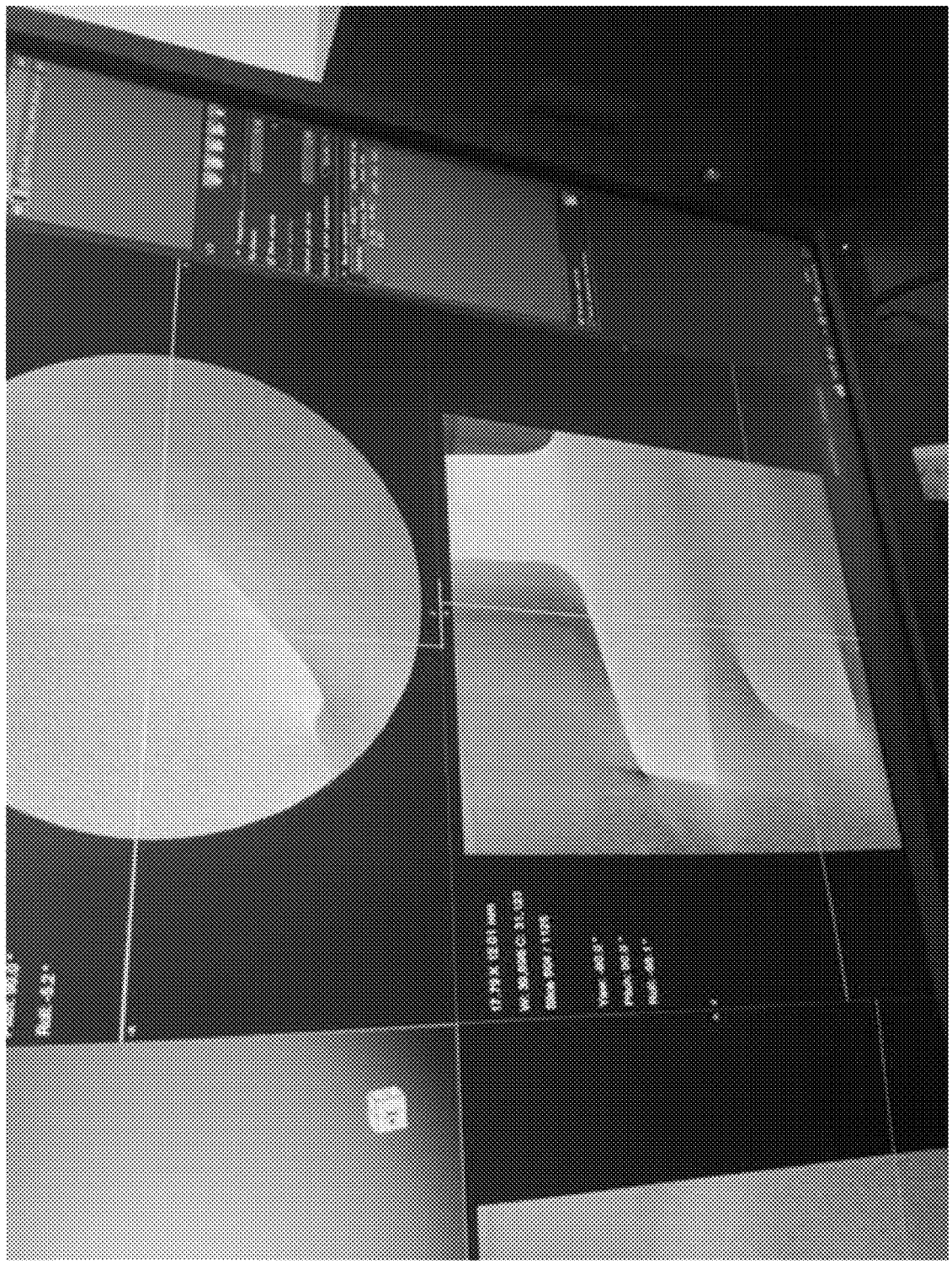
FIG. 3 is an exemplary CT scanning image of a gas turbine at the root of the blade according to some embodiments of the present disclosure.
Figure 4:
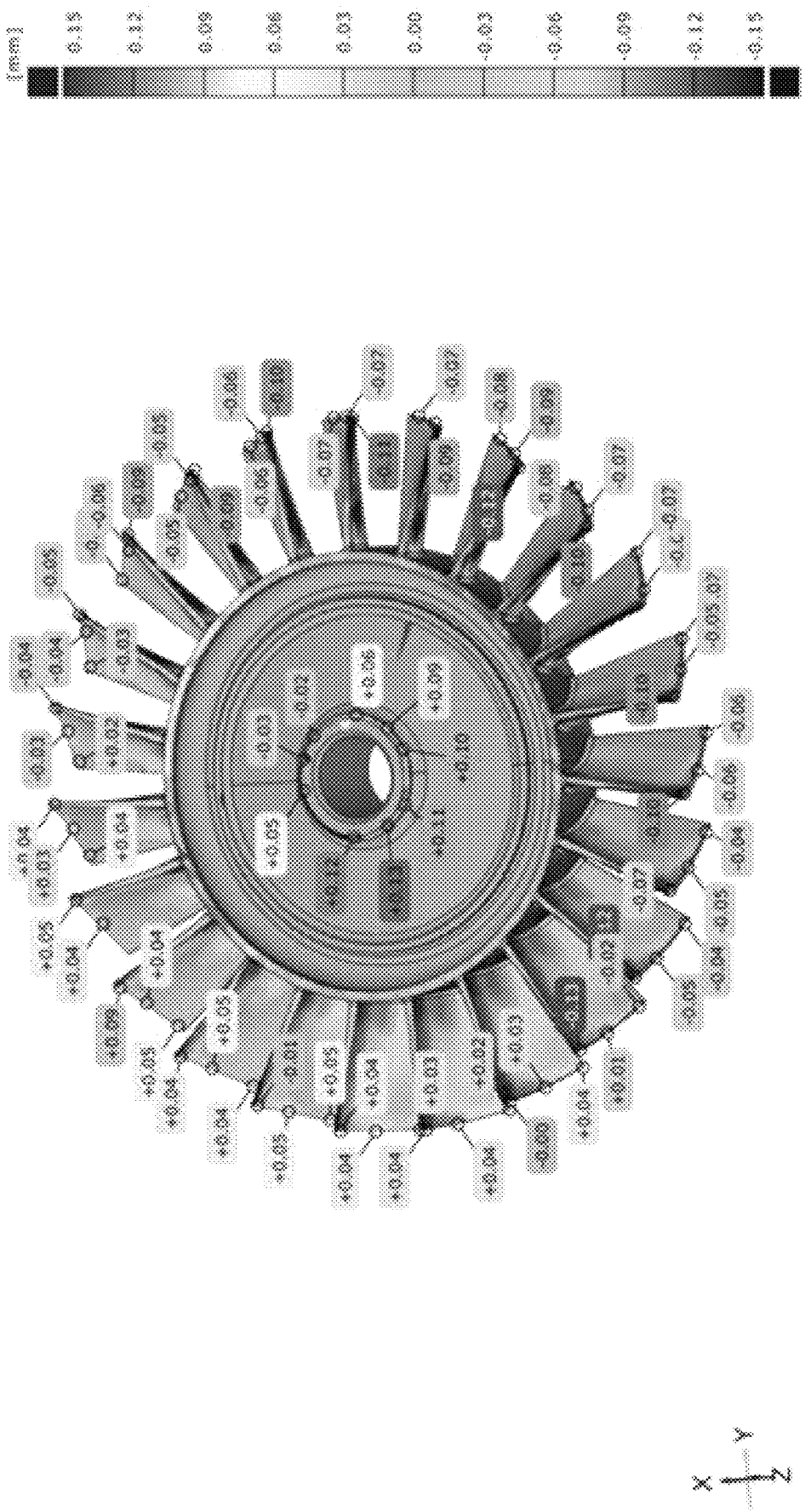
FIG. 4 is an exemplary schematic diagram of dimensions of the gas turbine under a three-dimensional scan according to some embodiments of the present disclosure.
Figure 5:
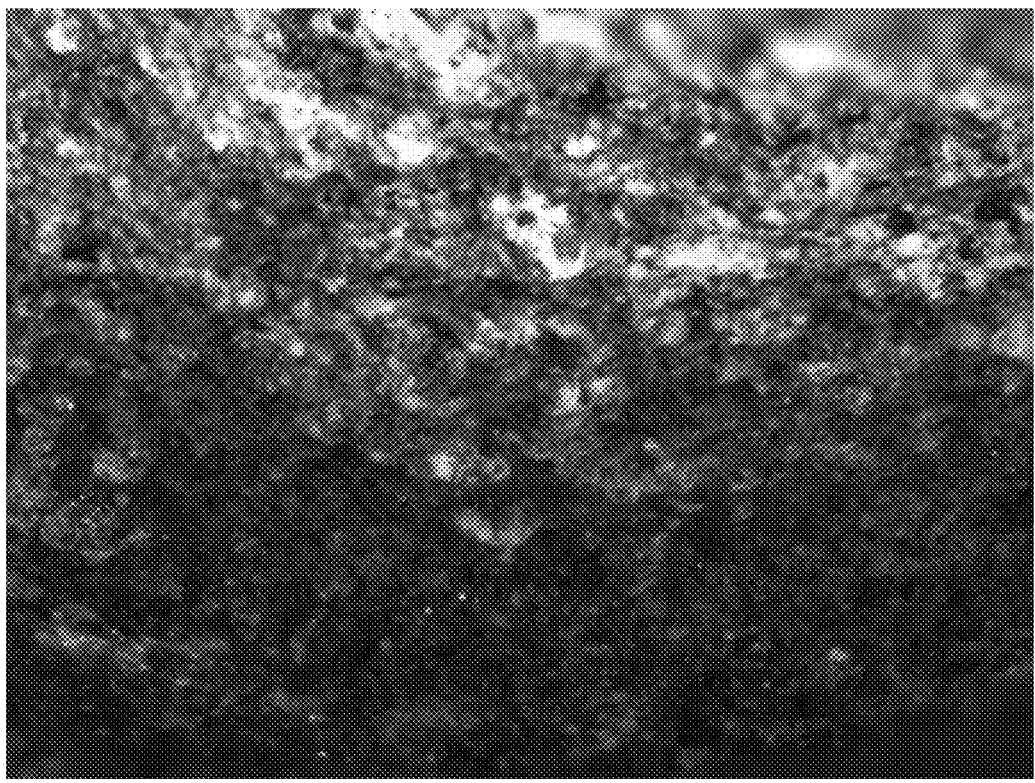
FIG. 5 is an exemplary micrograph illustrating blade ablation according to some embodiments of the present disclosure.
Figure 6:
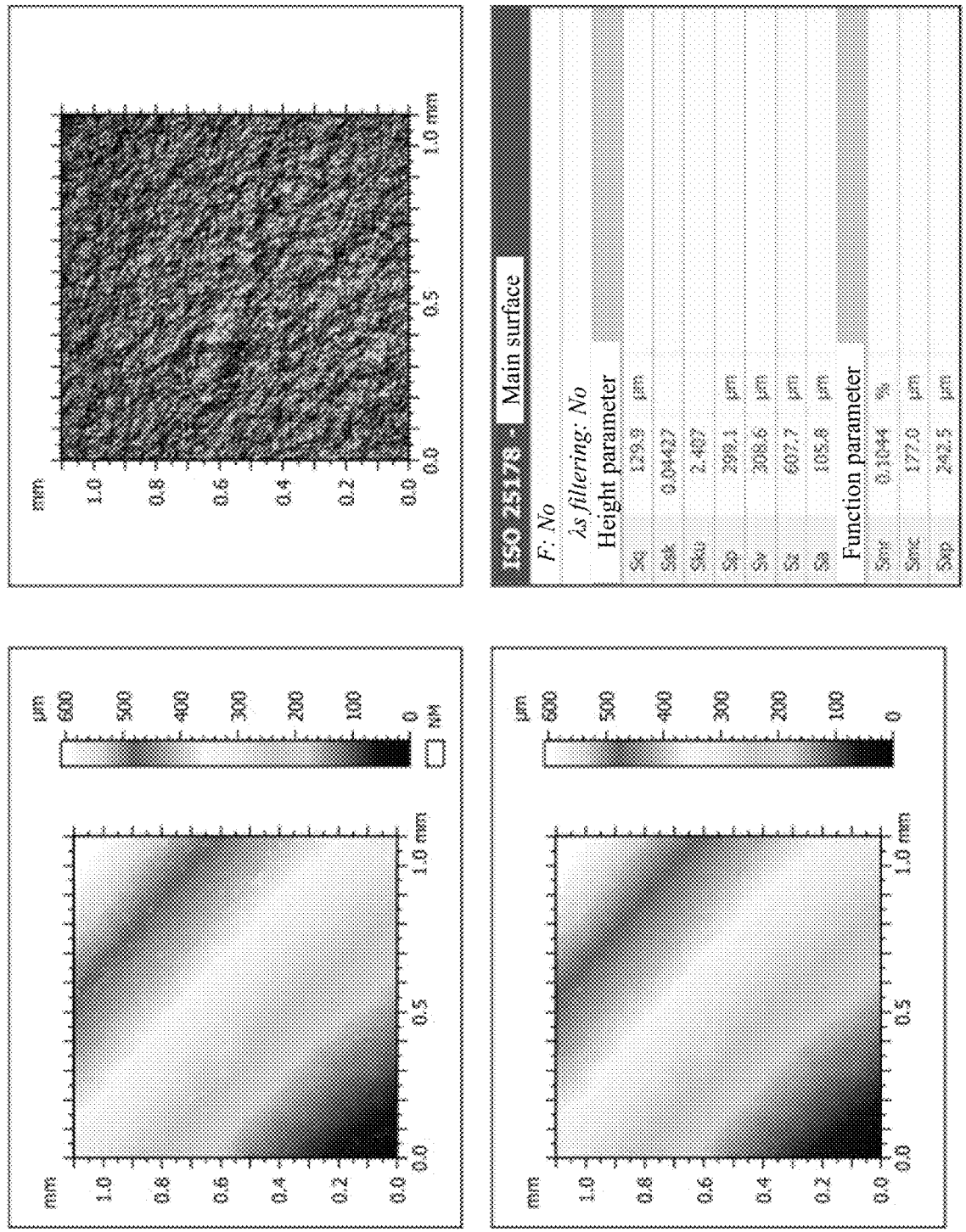
FIG. 6 is an exemplary schematic diagram illustrating the blade surface roughness parameter Sa and the surface topography according to some embodiments of the present disclosure.

Structural damage is a state where physical performance of the components of the engine decreases or structural integrity of the components of the engine is damaged. The typical structural damage is shown in FIGS. 3-6. For example, the gas turbine may have damage such as wear or the ablation due to high-temperature gas scouring or ablation. FIG. 3 is an exemplary CT scanning image of a gas turbine at the root of the blade according to some embodiments of the present disclosure; FIG. 4 is an exemplary schematic diagram of dimensions of the gas turbine under a three-dimensional scan according to some embodiments of the present disclosure; FIG. 5 is an exemplary micrograph illustrating blade ablation according to some embodiments of the present disclosure; FIG. 6 is an exemplary schematic diagram illustrating the blade surface roughness parameter Sa and the surface topography according to some embodiments of the present disclosure.

The structural damage index of the non-major component may characterize the current health of the small turboshaft engine. The structural damage index may reflect the type of damage and the corresponding degree of damage to the components of the engine.

In some embodiments, the structural damage index may be the type of damage and corresponding specific value (e.g., a crack length of the component and a wear depth of the component, etc.), or other parameters that characterize the current state of health.

In some embodiments, the processor may screen the non-major component that has a coupling relationship with the structural damage of the typical components and determine a structural damage index of the non-major component based on the coupling relationship. For example, if the non-major component that has a coupling relationship with the structural damage of the turbine blade include the gearbox (e.g., imbalance due to small cracks in the turbine blades may be transmitted to the gearbox), then the structural damage index of the gearbox may be determined as the structural damage index of the non-major component. Because changes in the vibration level of the gearbox may be coupled to the structural damage of the turbine blades, although the gearbox is not a major failure source of the engine, the processor may monitor the vibration level (e.g., up or down) of the gearbox and screen the vibration level of the gearbox as the structural damage index of the non-major component.

In some embodiments, the screening of the structural damage index of the non-major component depends on whether the structural damage is coupled to the amount of creep deformation of the gas turbine. In some embodiments, the structural damage index of the non-major component includes structural damage of the gas turbine combustion chamber, structural damage of the gas turbine guide, and structural damage of the power turbine that impact the operating condition of the gas turbine. That is to say, there is a coupling relationship between the structural damage of the gas turbine combustion chamber, the structural damage of the gas turbine guide, and the structural damage of the power turbine, and the amount of creep deformation of the gas turbine.

Compared with turbojet and turbofan engines, the special characteristics of turboshaft engine in terms of reliability are that: due to the need for the engine to work in a high-power state during the helicopter's takeoff, climbing, and hovering, and the significant changes in working state, the components are prone to low-frequency thermal cycling fatigue damage when subjected to the thermal shock. The gas turbine is located at the back of the combustion chamber and in direct contact with high-temperature and high-pressure gas, which is subjected to centrifugal force and bending moment, thermal stress, vibration stress, and aerodynamic force, therefore damage characterization of the gas turbine is required. For example, it may be characterized by the apparent damage of the gas turbine, and the contents about how to detect the apparent damage of the gas turbine are described in a subsequent section.

In operation 130, destructive damage to components occurring in the small turboshaft engine and indirect damage causing changes in the material properties of a key component are selected.

The destructive damage is a form of damage and/or a degree of damage that directly physically damages components of the engine, resulting in a loss of structural integrity or a significant reduction in performance of the components. For example, the fatigue fracture of the turbine blade due to a high-temperature and high-pressure environment.

In some embodiments, the destructive damage may include a crack length of a gas turbine, a crack length of a gas turbine guide, a crack length of a main combustion control of a gas turbine combustion chamber, a blade creep elongation of a power turbine, or the like.

After prolonged operation or under extreme operating conditions, the gas turbine, the gas turbine guide, the gas turbine combustion chamber, and the power turbine may crack due to fatigue, thermal stress, and other factors. The crack length is the average length or depth of a crack measured in a plane. The crack length may be determined by non-destructive testing techniques (e.g., a fluorescent penetration detection technology, etc.). The creep elongation is the amount of elongation of material that produces creep deformation. The creep elongation may be determined by measuring the initial length of the material and the final length after the creep deformation. The contents about the fluorescent penetration detection technology may be referred to the later relevant description.

The main combustion control of the gas turbine combustion chamber is a structure or device that relates to the operating state of the main combustion area. In some embodiments, the main combustion control may include sensors for monitoring and controlling the combustion process. For example, as the engine operates, the structure of the main combustion control may be subjected to scouring by high-temperature gases and solid particles, resulting in an increase in an ablation degree of its surfaces and/or the roughness of its surfaces, and the main combustion control may monitor these parameters (i.e., the ablation degree and/or the roughness, etc.) through deployed sensors. In some embodiments, the gas turbine combustion chamber is typically designed to contain a plurality of areas to accommodate different combustion phases and conditions, and the main combustion area is an area of the combustion chamber where the fuel is most fully mixed with the air and combustion reaction is most intense.

The indirect damage refers to a form of damage that does not directly damage the structure of the engine's components, but indirectly leads to reduction in the performance of the components or failure of the components by changing the material properties of the components or the working environment. For example, an increase in surface roughness and formation of the ablative pits in the combustion chamber assembly due to high-temperature gas scouring and ablation.

In some embodiments, the indirect damage may include an ablation degree of the blades of the gas turbine, a degree of surface roughness of the blades of the gas turbine, an ablation degree of the gas turbine guide, an ablation degree of the main combustion control of the gas turbine combustion chamber, and the surface roughness around the main combustion control of the gas turbine combustion chamber, or the like.

The main combustion control of the gas turbine combustion chamber is a component or system within the combustion chamber that is responsible for controlling the operating state of the main combustion area.

The ablation degree is a parameter, i.e., a percentage parameter, used to measure a degree of erosion on the surface of the material. When the blades of the gas turbine are in directly contact with an area of high-temperature gas, the blades are susceptible to the ablation due to scouring of particulate matter in the gas, high-temperature oxidation, thermal corrosion, and other factors.

The surface of the blades of the gas turbine may become rough and uneven due to long-term exposure to high-temperature gas and corrosion. In some embodiments, a specific value of the surface roughness of the gas turbine guide may be obtained by scanning the surface of the gas turbine guide using a surface roughness measuring instrument (e.g., a profilometer, etc.).

In operation 140, a structural damage monitoring means is planned based on the failure mode, the structural damage index of the non-major component, the destructive damage, and the indirect damage.

The structural damage monitoring means is a monitoring means for monitoring damage condition of the small turboshaft engine. For example, the processor may determine the damage condition of the engine by monitoring cracks in the engine, internal defects in the components of the engine, damage to blades of the gas turbine, and the surface roughness of the engine.

Currently, most turbine blade failures are in the normal failure form, i.e., failure due to a combination action of creep-fatigue interaction and creep damage. When the turbine blades are in service under high-temperature and high-pressure gas and the coupled state of complex stresses, the structural damage that usually occurs may be divided into two kinds, i.e., apparent damage and internal metallurgical tissue damage. The apparent damage mainly includes the blade radial elongation, the fatigue fracture, the reverse torsion, the pitting, the ablation, and the surface roughness change caused by the load, the thermal shock, and the surface particle erosion.

Internal metallurgical tissue damage is a series of metallurgical organization evolution and damage produced during the service process of the gas turbine, mainly including the degradation of the surface coating, the precipitation of Topologically Close-Packed Phase (TCP), the generation of Secondary Reaction Zone (SRZ), evolution of morphology of grain boundaries and grain boundary carbide, the decomposition of primary carbide (MC), and the formation of creep holes and cracks. During the service process of the gas turbines, factors such as the temperature, the load, the time, etc. are the main elements influencing the evolution and damage of the tissue, which are usually carried out slowly. Due to the arrangement of the detection process and the need for intermediate states of the damage process, the experimental detection stage is mainly for the apparent damage.

In some embodiments, the processor may determine the damage condition of the engine through multiple structural damage monitoring means. In some embodiments, the structural damage monitoring means may include one or more of penetration detection technique, CT scanning technique, radial clearance measurement, microscopic observation, or the like.

In some embodiments, for cracks generated during the service process, a surface opening defect may be detected using the fluorescent penetration detection technology. For example, first, the surface of the blade is thoroughly cleaned to remove oils and impurities; then, a penetrant containing a yellow-green fluorescent dye is uniformly applied to the surface of the blade; after waiting for a certain period of time, a cleaning agent is used to remove excess penetrant on the surface of the blade, but penetrant within the cracks is retained; next, a developer is applied to the surface of the blade, the developer attracts the penetrant within the cracks to form visible fluorescent traces; last, the surface of the blade is irradiated using a UV lamp in a dark room, the fluorescent traces at the cracks are clearly visible under the UV light, thereby confirming the existence and location of the cracks.

In some embodiments, the CT scanning technique may be used for detecting internal defects of the components. In some embodiments, internal cracks may exist in the turbine rotor after long-term use, and the CT scanning technique may be used for detecting these cracks. For example, first, the turbine rotor is placed on an inspection table of the CT scanning apparatus and the turbine rotor is ensured to be in a stable state; then, the CT scanning apparatus is started and a two-dimensional or three-dimensional tomographic image of the turbine rotor is generated. In the image, if defects such as cracks are present, they are clearly shown as areas with a different density (e.g., distinguished by color) than the surrounding material.

In some embodiments, the radial clearance measurement, three-dimensional scanning, and three-coordinate method may be used for detecting the creep deformation of the gas turbine blade. For example, the clearance between the turbine blade and the inner wall of the receiver may be measured directly using a clearance ruler to reverse derive the turbine dimension, thereby inferring the degree of the creep deformation of the gas turbine blade. For another example, the gas turbine may be scanned by a three-dimensional scanning instrument to calculate its specific dimension. For another example, the coordinates of the measurement points are obtained by slightly contacting the surface of the gas turbine with a probe and a contact probe in the probing system, so as to infer the degree of the creep deformation of the gas turbine blade.

In some embodiments, the microscope may be used to directly observe the pitting and the ablative damage of the gas turbine blade caused by high-temperature and high-pressure environment. For example, the optical microscopy may be used to perform multiple detection and multipoint detection on damage at the same site in the observation.

In some embodiments, for the surface roughness, the to-be-measured surface may first be complexed using a complex gel, and then the roughness of the complexed observable surface may be detected. For example, the surface roughness of the component may be indirectly detected by applying the gel-like substance on the to-be-measured surface, replicating the surface morphology, and processing the replicated surface into an observable surface.

The detection results of the plurality of the structural damage monitoring means described above may be transmitted to a processor to determine the damage condition of the engine.

In some embodiments, the main apparent damage to the gas turbine in the service process include the blade fatigue fracture and the creep deformation that may produce the destructive damage, surface roughness, the ablation, and oxidation that may have an impact on the material properties. FIG. 2 is an exemplary schematic diagram illustrating structural damage monitoring means according to some embodiments of the present disclosure.

For more information on the gas turbine non-destructive testing method, please refer to related contents of Table 1 below.

TABLE 1

The non-destructive testing method of gas turbine

| Type of damage | Method category | Specific testing manner | Detection capability |
|---|---|---|---|
| Fatigue crack | Penetrant detection | After penetrating the cleaned surface with a water-washable fluorescent penetrant and spraying the developer, the crack having a corresponding color change | Effective detection of surface opening cracks, cost-effectiveness, unable to detect cracks with blocked openings |
| | CT scanning detection | The gas turbine disk, which is fixed inside the CT scanner by a fixture, being scanned by the CT scanner, and the image being processed by a computer matched to the equipment | Effective detection of internal cracks, high accuracy, the reduced ability to detect the part with large thickness, time-consuming |
| Creep elongation | Radial clearance measurement | The clearance between the turbine blades and the inner wall of the receiver being directly measured using a clearance gauge to reverse derive the turbine dimension | The clearance size being measured directly to determine whether the limit is exceeded, which is highly efficient, manual testing errors being unavoidable. |
| | Three-dimensional scanning | Scanning the gas turbine by a three-dimensional scanning instrument to calculate its specific dimension. | High accuracy of three-dimensional scanning, intuitive effect diagram, the actual calculation results having a large error |
| | Three-dimensional coordinate method | Obtaining the coordinates of the measurement points by slight contacting with the surface of the to-be-measured component with a probe and a contact probe in the probing system | high measurement precision, small error, intuitive measurement results |
| Ablation | Direct observation using a microscope | Performing a multiple detection and multipoint detection on damage at the same site using an optical microscope during observation | Intuitive damage performance, large amount of data acquisition, realizing multi-point analysis, high efficiency |
| Surface roughness | Complexing the complex gel surface | The surface roughness of a component being indirectly measured by applying a gel-like substance to the to-be-measured surface, replicating the surface morphology, and processing the replicated surface into an observable surface | Precision of the complexing being at the micron level, with high reproducibility, disposable item, high cost |

In some embodiments, to-be-measured components except for the typical components may include the combustion chambers, the gas turbine guides, and the power turbines. Depending on the service environment, the damage that needs to be detected for the above components and the detection means may be referred to the related contents of Table 2 below.

TABLE 2

Detection method of structural damage of other important components

| Detection components | Type of damage | Method category | Specific testing manner |
|---|---|---|---|
| Gas turbine guides | Fatigue crack | Penetrant detection | After penetrating the cleaned surface with a water-washable fluorescent penetrant and spraying the developer, the crack having a corresponding color change |
| | Ablation | Direct observation using the microscope | Performing a multiple detection and multipoint detection on damage at the same site using an optical microscope during observation |
| Combustion chamber | Cracks near the main combustion hole The ablation of main combustion hole | Direct observation using the microscope | After confirming the location of the cracks, observing the crack length and a number of the cracks Performing a multiple detection and multipoint detection on damage at the same site using an optical microscope during observation |
| | Surface roughness | Complexing the complex gel surface | The surface roughness of a component being indirectly measured by applying a gel-like substance to the to-be-measured surface, replicating the surface morphology, and processing the replicated surface into an observable surface |
| Power turbine | Creep deformation | Radial clearance measurement | The clearance between the turbine blades and the inner clearance gauge to reverse wall of the receiver being directly measured using a derive the turbine dimension |

In operation 150, an accelerated mission test platform of a small turboshaft engine is designed, and the torque automatic loading scheme of the eddy current dynamometer is designed based on the properties of the eddy-current dynamometer of the accelerated mission test platform and the small turboshaft engine as the experimental carrier.

The accelerated mission test platform is a platform used to perform accelerated mission test work on the small turboshaft engine. For example, if one small turboshaft engine needs to undergo an accelerated mission test to evaluate its durability and performance under high power output condition, the small turboshaft engine may be installed on the test bench of the accelerated mission test platform and connected to the fuel system, a control system, and a data acquisition system. Then, the torque automatic loading scheme of the eddy current dynamometer may be designed according to the test scheme.

For example, the processor may complete the acceleration task test work of the turboshaft engine by the following steps. An engine accelerated mission test platform is constructed. The platform integrates the data acquisition system, etc. During the test process, the data acquisition system records in real-time selected engine performance parameters (e.g., rotational speed, the exhaust temperature, the fuel flow, or a fuel remaining amount, etc.) and vibration conditions (including vibration displacement, vibration acceleration, or a decibel value, etc.). After completing the specified number of test cycles (the number of cycles may be determined by manual experience), the engine is disassembled, and the components are inspected. The inspection results are compared with the initial data of the components, and a comparative verification report is issued. The number of cycles depends on the demand for damage detection and the life of the wearing parts; after the engine is disassembled, the engine is cleaned, visually inspected, dimensionally inspected, and non-destructive tested. According to the inspection results, the wearing components are repaired and replaced, and necessary dynamic balancing adjustments and reassembly are performed on the wearing parts. Subsequently, the engine is tested again, entering the next cycle of the life test. After a number of cycle-life tests, if the key components produce significant damage, the engine is judged to have reached the limit of its life, and it is necessary to replace the engine with a new engine to continue the test; cycle-life test continues until the end of the cycle-life test work. The data collected in Tables 1 and 2 may be used in combination with the structural damage monitoring means to determine the current state of the structural damage of the engine. By means of periodic detection, the health status of the engine may be obtained at different points.

In some embodiments, the accelerated mission test platform may include a test workshop and one or more of an engine fuel system, the control system, the data acquisition system, the test bench, the eddy current dynamometer, an electrical system, an air intake and exhaust system, etc., arranged in the test workshop. For more content on the accelerated mission test platform, please refer to FIG. 7 and the related description.

The torque automatic loading scheme refers to a control strategy for the eddy current dynamometer designed to simulate the acceleration task of the small turboshaft engine.

The experimental carrier is a turboshaft engine with the same material and type as the small turboshaft engine to be tested. The experimental carrier may be used to design the torque automatic loading scheme for the eddy current dynamometer. In some embodiments, the experimental carrier may include a turboshaft engine SPT15-RX, with a power of 15 KW.

An eddy current dynamometer (hereinafter referred to as a dynamometer) is a device used to absorb and measure the shaft power output from an engine. For example, an eddy current dynamometer may utilize the eddy current principle to generate eddy currents in conductors through electromagnetic induction, which interacts with a magnetic field to generate resistance, thus achieving simulation and measurement of rotating machinery. In some embodiments, a small turboshaft engine may be coupled to an input of the eddy current dynamometer via an output shaft to form a power transfer link, so that the torque and power generated by the engine are transferred via the power transfer link to the dynamometer. The eddy current dynamometer also has a loading adjustment function to adjust the shaft power output from the engine.

In some embodiments, the loading torque of the eddy current dynamometer needs to vary in real time based on the current speed of the engine.

The loading mode of the eddy current dynamometer may include a constant torque mode and a constant speed mode.

In some embodiments, when the eddy current dynamometer is in constant torque mode, the loading torque of the eddy current dynamometer may be adjusted in real time by adjusting a setting knob (i.e., a pre-set knob for adjusting the loading torque) to match the torque needed by the output shaft of the engine at the current speed. That is to say, the loading torque of the eddy current dynamometer is adjusted in real time so that the torque of the output shaft of the engine is constant. Constant torque mode may not be applicable to all test scenarios due to the difficulty of ensuring accurate loading at all times during cyclic loading.

In some embodiments, when the eddy current dynamometer is in a constant speed mode, the speed of the output shaft of the engine may be maintained at a constant speed by automatically adjusting the loading torque of the eddy current dynamometer. The maximum permissible speed of the eddy current dynamometer may be preset (e.g., 6050 rpm).

In some embodiments, the torque automatic loading scheme of the eddy current dynamometer may be set to the constant speed mode, the maximum speed of the output shaft of the small turboshaft engine and the maximum speed of the eddy current dynamometer may be set, and the independent adjustment of the loading torque may be completed through a negative feedback adjustment.

In some embodiments, the maximum speed of the output shaft of the engine may be set at a value slightly above the maximum permissible speed of the eddy current dynamometer, which may ensure that when the power provided by the gas turbine of the engine exceeds the output power formed by the output shaft with the additional torque, the gas turbine speed is no longer increased, thus protecting the engine. In some embodiments, the maximum speed of the output shaft of the engine may be limited so as to indirect limiting the maximum speed of the gas turbine.

In some embodiments, when the gas turbine of the engine is operating at a preset speed, if the engine speed approaches or reaches a set maximum engine speed (6200 rpm) due to increased load (e.g., automatic loading of the eddy current dynamometer), the eddy current dynamometer is automatically loaded to increase torque to reduce the speed of the eddy current dynamometer to a set maximum speed of the eddy current dynamometer (e.g., 6050 rpm), while ensuring that the engine power is the same as before.

In some embodiments, in order to enable the output shaft of the engine to once again operate at the predetermined speed, the gas turbine speed is once again increased to provide more power, causing the output shaft of the engine to once again reach a limited maximum speed of the gas turbine.

In this case, the negative feedback adjustment is formed, which controls the eddy current dynamometer's torque to change with the change of the gas turbine of the engine through the output shaft speed. This process may lead to an unlimited increase in the mutual influence between the torque of the eddy current dynamometer and the gas turbine speed. However, because of the use of the gas turbine speed spectrum, the command given to the engine is the gas turbine speed signal. With the two-way restriction, the purpose of changing the torque of the eddy current dynamometer with the gas turbine speed may be realized.

Figure 10:
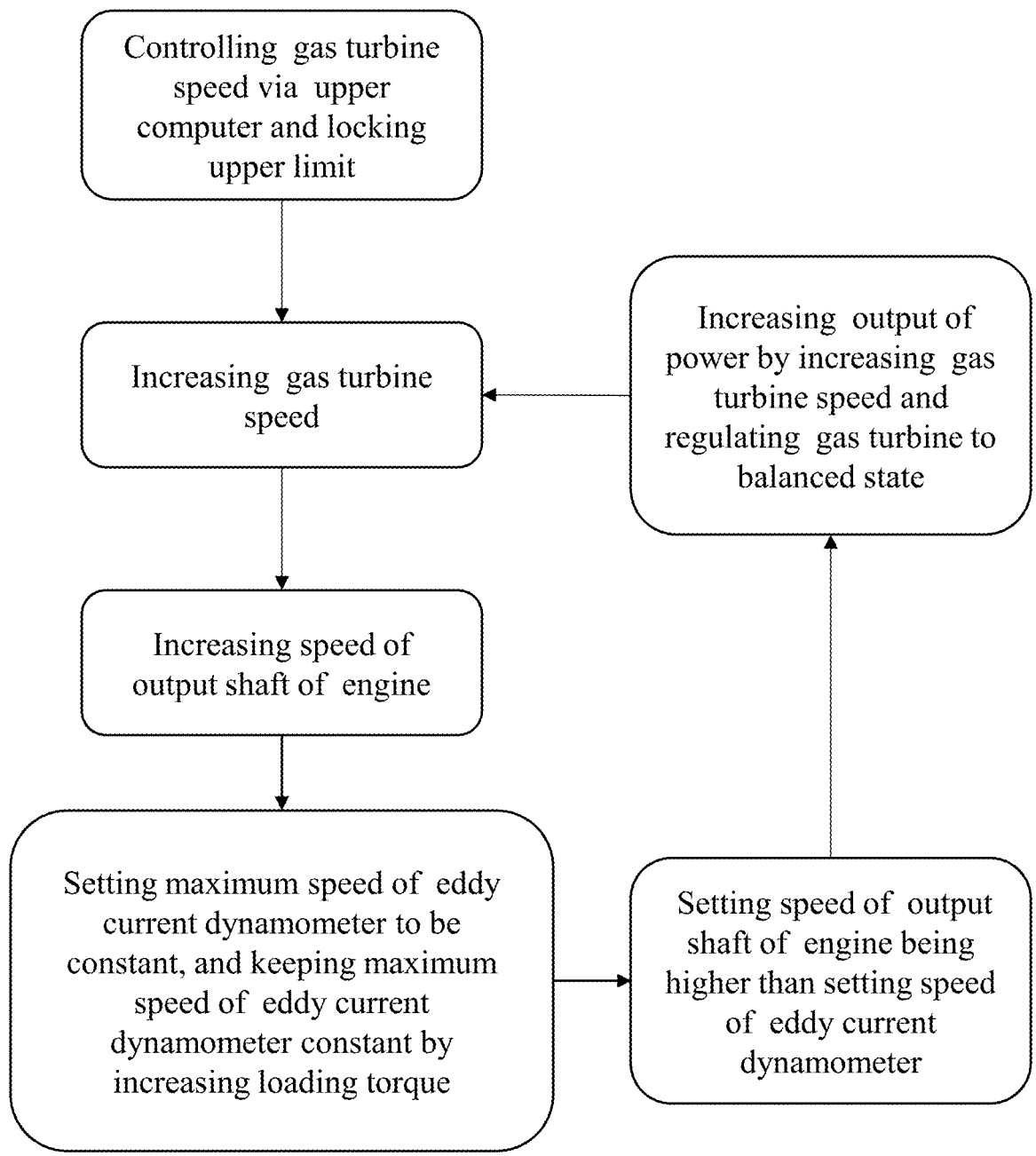
FIG. 10 is an exemplary schematic diagram illustrating torque loading of an eddy current dynamometer according to some embodiments of the present disclosure.

As shown in FIG. 10, in some embodiments, the processor may control the gas turbine speed via the upper computer while determining an upper limit on the gas turbine speed. Further description of the upper computer may be found in FIG. 7. In some embodiments, the processor may control the increase of the gas turbine speed based on the automatic feedback adjustment described above. The increase of the gas turbine speed may result in an increase of the speed of the output shaft of the engine. In some embodiments, the processor may set the maximum speed of the eddy current dynamometer to be constant while keeping the maximum speed of the eddy current dynamometer constant by increasing the loading torque. In some embodiments, the processor may set the speed of the output shaft of the engine higher than the set speed of the eddy current dynamometer, increase the output of power by increasing the gas turbine speed, and regulate the gas turbine to a balanced state. The increase of the gas turbine speed may further result in an increase of the speed of the output shaft of the engine, thereby continually adjusting and controlling the gas turbine to a balanced state through this feedback loop.

In operation 160, the small turboshaft engine is tested, and the small turboshaft engine is subjected to damage monitoring based on the planned structural damage monitoring means.

In some embodiments, a small turboshaft engine may be cycle-tested via an accelerated mission test platform. For example, an eddy current dynamometer may be controlled according to a torque automatic loading scheme to test a small turboshaft engine. More contents on the test of a small turboshaft engine via an accelerated mission test platform may be found in operation 150 and FIG. 7 and related description.

During the test process, the processor may perform damage monitoring on the small turboshaft engine after the test according to the planned structural damage monitoring means. For example, the processor may complete health monitoring of the current state of the engine based on the performance parameters obtained from the cycle test of the small turboshaft engine and the structural parameters obtained from the structural damage detection scheme after quantitative processing. The processed data may be applied to damage equivalency validation for accelerated mission test.

In some embodiments, the processor may perform damage monitoring once after every completing pre-determined number of test cycles. Based on the results of each damage monitoring, partial components of the engine may be replaced. If there is a significant loss of key component of the engine, the engine may be replaced at this time.

In some embodiments, the processor may also determine whether or not to perform damage detection on the small turboshaft engine based on an engine health index. More content on how to determine whether to perform damage detection may be found in FIG. 11 and related description.

According to some embodiments of the present disclosure, by the structural damage monitoring method described above, it is possible to simulate the load and damage condition of the engine according to the actual condition of the engine in the service process, ensuring that the entire experimental process of the engine is more stable and accurate, so that the engine may be replaced in a timely manner when damage occurs.

It should be noted that the foregoing description of the process 100 is intended to be exemplary and illustrative only and does not limit the application scope of the present disclosure. For those skilled in the art, various corrections and changes to the process may be made under the guidance of the present disclosure. However, these corrections and changes still fall within the scope of the present disclosure.

Figure 7:
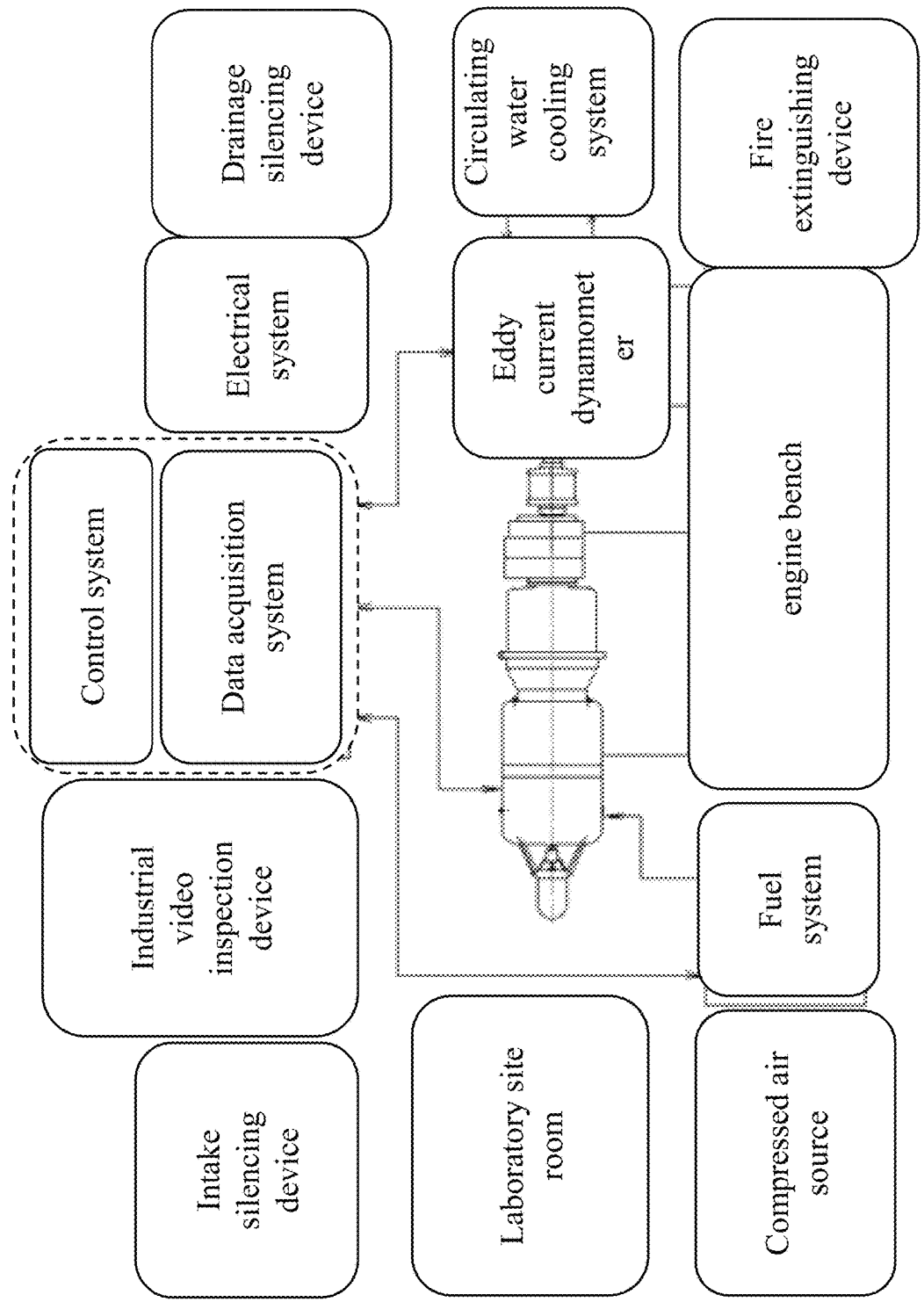
FIG. 7 is an exemplary schematic diagram illustrating an accelerated mission test platform for a turboshaft engine according to some embodiments of the present disclosure.
Figure 8:
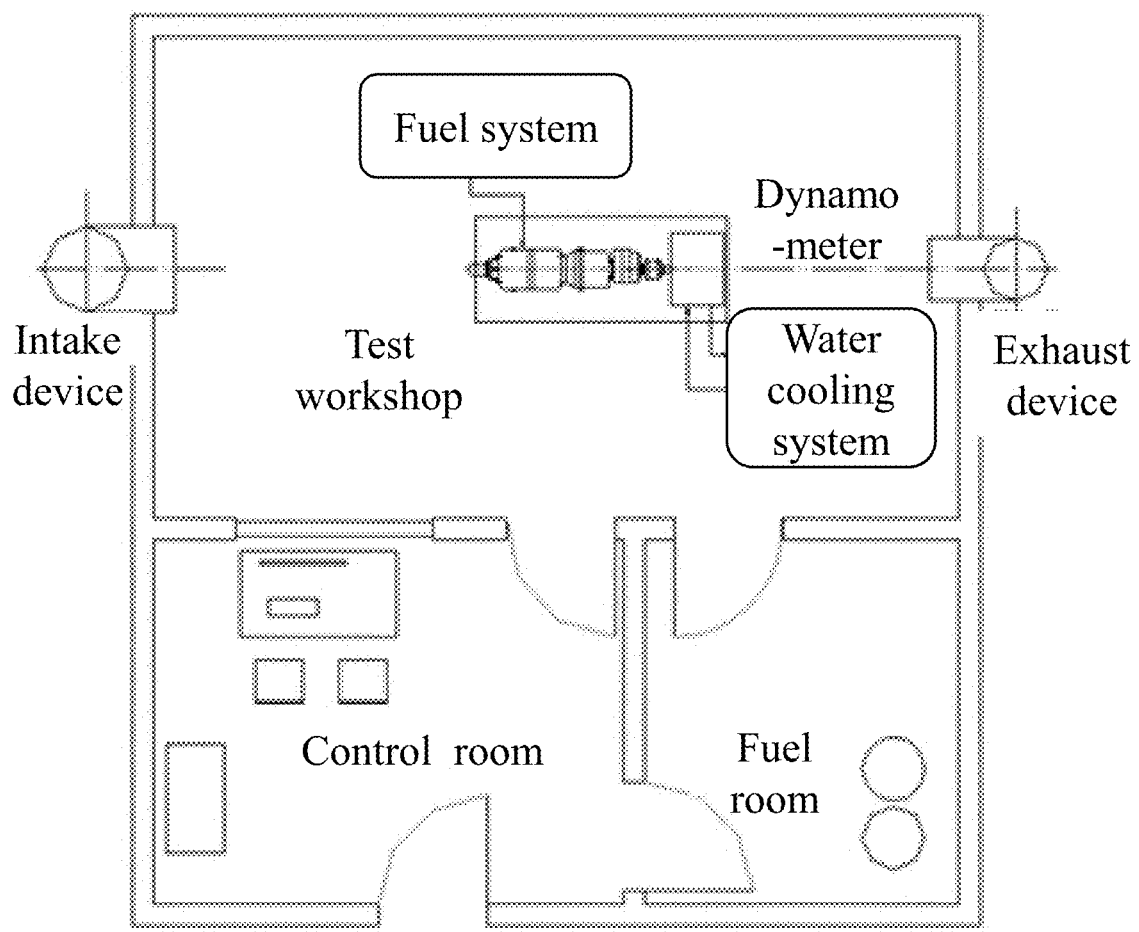
FIG. 8 is an exemplary schematic diagram illustrating a test workshop layout according to some embodiments of the present disclosure.

As shown in FIG. 7 and FIG. 8, in some embodiments, the accelerated mission test platform may include a test workshop, and an engine fuel system, a control system, a data acquisition system, a test bench, an eddy current dynamometer, an electrical system, and an air intake and exhaust system arranged in the test workshop.

The test workshop may be configured to perform a test on a small turboshaft engine. In some embodiments, the test workshop may house the engine fuel system, the control system, the data acquisition system, the test bench, the eddy current dynamometer, the electrical system, the air intake and exhaust system, and the engine.

In some embodiments, the test workshop needs to meet the requirements of sturdiness and good sound insulation. For example, sound-absorbing equipment, such as sponges, may be installed to cover the walls of the test workshop for noise reduction. In some embodiments, the number of the test workshops may be a plurality. For example, there may be three test workshops, one test workshop is used for placing the engine, the test bench, the eddy current dynamometer, the air intake and exhaust system, and other peripheral accessory equipment; one test workshop (also known as the control room) is used for placing the control system and the data acquisition system, and one test workshop (also known as the fuel room) is used for placing the engine fuel system, etc. The arrangement of the test workshops is shown in FIG. 7 and FIG. 8.

In some embodiments, a fire extinguishing device may also be configured in the interior of the test workshop, and the fire extinguishing device may be used for fire detection, alarm, and fire extinguishing work.

In some embodiments, the engine fuel system may be configured to provide fuel for a test engine. The test engine is a turboshaft engine that needs to be tested. In some embodiments, the engine fuel system may include a device such as a fuel tank, a tank rack, a fuel attachment, or the like.

In some embodiments, the control system may be configured to control the test engine (i.e., the engine being tested). In some embodiments, the control system may include an electronic control unit (ECU) connected to the test engine; an acquisition chassis that receives output signal from the ECU and the eddy current dynamometer, an automatic torque loading system for adjusting the loading amount of the eddy current dynamometer, and an upper computer and upper computer control program that have the functions of controlling the engine and controlling or converting signals from the acquisition chassis. In some embodiments, the processor may be integrated into the control system or may be implemented via the ECU.

The acquisition chassis processes the analog signals sent by the ECU and the eddy current dynamometer, converts the analog signals, and then sends the converted analog signals to the upper computer for display and recording. The automatic torque loading system of the eddy current dynamometer ensures that the engine power is stabilized in the constant speed mode during the process.

An upper computer is a device that provides an intuitive operator interface. In some embodiments, the upper computer and the upper computer control program simultaneously have functions such as inputting instructions to control the engine, converting the acquisition chassis signals, displaying the total exhaust temperature, the output power, the fuel flow, the gas turbine speed, the output shaft speed, a load spectrum, or the like. The load spectrum is a description of the change in the load value for a carrier within the agreed parameters and range.

Figure 9:
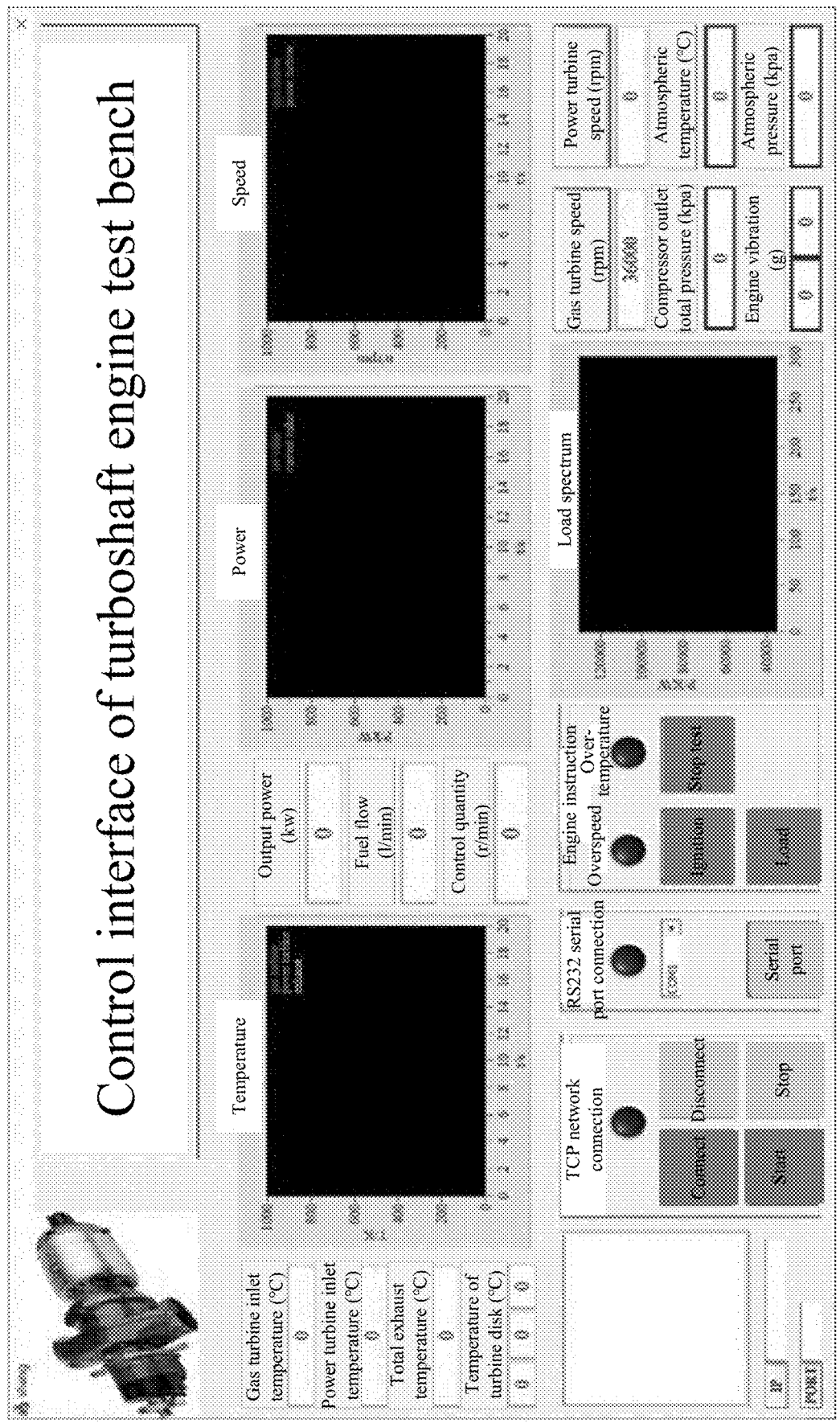
FIG. 9 is an exemplary schematic diagram illustrating a control interface of an upper computer control program of an accelerated mission test platform of a turboshaft engine according to some embodiments of the present disclosure.

In some embodiments, as shown in FIG. 9, the user may control the engine through an operator interface of the upper computer. For example, the user may control the running and stopping of the engine by entering instructions at the operator interface. In some embodiments, the operator interface may include control buttons for TCP network connection such as connecting, starting, disconnecting, stopping, etc., and a serial port connection button; and may also include control buttons for engine instructions such as ignition, stopping test, loading, etc. In some embodiments, the operator interface may also display the gas turbine speed, the power turbine speed, the total pressure at the outlet of the compressor, the atmospheric temperature, the engine vibration, the atmospheric pressure, the gas turbine inlet temperature, the power turbine inlet temperature, the exhaust temperature, the turbine disk real-time temperature, the output power, the fuel flow, or the like. In some embodiments, the operation interface may display the exhaust temperature and the current power in the form of a time curve.

In some embodiments, the upper computer may be connected to various modules of the accelerated mission test platform via a TCP/IP protocol suite. For example, the upper computer may receive sensing signals from a plurality of sensors in the acquisition chassis in real-time via the TCP/IP protocol suite, and convert and display corresponding parameters in real time.

In some embodiments, the user may, via the upper computer, select a preset load to vary the simulated speed of the engine, thereby assessing the performance of the engine under different operating conditions. In some embodiments, since ECU may have compatibility issues, the upper computer may communicate with the acquisition chassis via a TCP/IP protocol suite, and connect to the ECU via a serial port, thereby realizing comprehensive data interaction and control instructions issuance. It should be noted that the connection is engine-ECU-GSU (Ground Support Unit)-upper computer, and due to some problems within the ECU internal program, when accessing the external control program, it may lead to a garbled display of the GSU, but it does not affect the upper computer to control the engine. Therefore, for some parameters that may be read directly through the GSU, there is a need to additional install sensors for monitoring the real-time status of the engine. The GSU is the terminal for displaying and adjusting engine parameters.

In some embodiments, when the upper computer establishes a stable connection with the acquisition chassis and the ECU respectively, and confirms that the connection is normal, the user may input the ignition instruction and prepare for the test operation. The user sends the ignition instruction through the upper computer, and the control program inside the ECU starts the engine to the idling state (e.g., 32,000 rpm, etc.). After the user inputs the loading instruction, the upper computer reads the load spectrum in the loading instruction and sends the speed control signal to the engine at a preset frequency (e.g., 0.2$s$/time) to control the speed of the output shaft of the engine to simulate the actual working state in the cycle, and at the same time monitors and displays the engine state parameters in real-time (e.g., the engine's real-time speed), so as to confirm whether the engine runs in compliance with the requirements. After completing a complete cycle, the engine automatically returns to idle state, at this time, the user may issue a stopping test instruction through the upper computer to safely stop the engine from running and perform subsequent maintenance work such as cold blowing and refueling. The control interface of the upper computer control program is shown in FIG. 9.

In some embodiments, the upper computer may record and display time curves of key parameters, such as the exhaust temperature and output power, in real time during the test process, and attach detailed data, such as the fuel flow and the output shaft speed, to the time curves, so as to provide a comprehensive basis for engine health assessment.

In some embodiments, the acquisition chassis may process the analog signals sent by the ECU and the eddy current dynamometer, convert the analog signals, and transmit the converted analog signals to an upper computer for displaying and recording.

In some embodiments, the eddy current dynamometer ensures that the engine maintains stable power in a constant speed mode.

In some embodiments, the data acquisition system may be configured to acquire and record test parameters.

In some embodiments, the data acquisition system may monitor some of the internal engine parameters output by the ECU, as well as parameters detected by externally installed sensors. Parameters detected by the externally installed sensors include the gas turbine speed, the exhaust temperature, the fuel flow, the fuel remaining amount, the vibration acceleration, or the like.

In some embodiments, the gas turbine speed may be measured by inputting the acquired speed signal into the acquisition chassis via an external Hall element. In some embodiments, to ensure that the engine is not over-tempered during operation, the data acquisition system may utilize a temperature sensor to monitor the exhaust temperature. The location of the temperature sensor needs to be determined by comparing temperatures under different positions of the tailpipe. For example, the location in the tailpipe with the highest temperature is selected to set the temperature sensor. The location in the tailpipe with the highest temperature is typically in the upper right of the nozzle center of the tailpipe and the temperature sensor needs to be calibrated prior to test. Due to the incomplete linearity of the temperature sensor and the fact that the temperature and output voltage curves do not pass through the origin, the data acquisition system may fit the detected temperature data and input the fitted data into the upper computer control program to obtain the actual temperature.

In some embodiments, the data acquisition system may also be configured to acquire, process, and record engine performance parameter data and engine health status data.

In some embodiments, the data acquisition system may include a performance parameter monitoring system and a health monitoring system.

In some embodiments, the performance parameter monitoring system may be configured to measure performance parameters and monitor the measured performance parameters. In some embodiments, the performance parameter may include a gas turbine speed, an exhaust temperature, a fuel flow, a fuel remaining amount, etc. In some embodiments, the performance monitoring system may include one or more of a temperature sensor, a flow sensor, and a fuel quantity measurement device (e.g., a capacitive sensor) disposed at a corresponding location. The corresponding location may include an intake pipe, an exhaust pipe, a fuel tank, a gas turbine, etc. For example, a temperature sensor disposed at an exhaust pipe of the air intake and exhaust system may measure an exhaust temperature, and a fuel quantity measuring device disposed at the fuel tank may measure a fuel remaining amount, etc.

In some embodiments, the health monitoring system may be configured to detect a vibration condition and monitor the health status of the test engine through the detected vibration condition. In some embodiments, the vibration condition may include the vibration displacement, the vibration acceleration, and the decibel. In some embodiments, the health monitoring system may include one or more of a vibration sensor, a laser vibrometer, an accelerometer, an acoustic measuring instrument, etc.

Because the operating temperature in the maximum state is too high, some components are not directly connected the vibration sensor, so vibration monitoring may be performed with both direct and indirect contact solutions. For areas where the temperature is not very high (e.g., gearboxes, etc.), a close-fitting vibration sensor may be used to obtain the vibration in the area by attaching the vibration sensor tightly to the engine. For areas with high temperatures (e.g., the gas turbine, a power turbine housing), laser displacement sensors may be selected to measure vibration. By hitting a laser on a high-temperature area, it is possible to monitor whether the engine vibration is within a safe range in the maximum state. If the vibration is within the safe range, the engine is probably in good health, and vice versa. When an engine has serious structural damage such as internal scratches, the noise generated by the engine's operation may change. Through the sound intensity probe of the acoustic measuring instrument, the acoustic pressure signal may be converted into an electrical signal, so as to measure the noise under the current working condition and then compare it with that of normal working conditions to detect the health status of the engine.

In some embodiments, the test bench may be configured to mount a test engine or an eddy current dynamometer, etc. The setup of the test bench may ensure that subsequent removal of the test engine or the eddy current dynamometer may proceed smoothly.

In some embodiments, the eddy current dynamometer may be configured to absorb and meter shaft power output from the test engine, the eddy current dynamometer having a loading amount adjustment function. In some embodiments, the eddy current dynamometer may simulate different loading conditions encountered by the engine during actual operation by adjusting the loading amount, thereby assessing the performance of the engine under different loads. Further description of the eddy current dynamometer may be found in FIG. 1 and related description.

In some embodiments, the electrical system may be configured to supply power to various systems within the test workshop. For example, the electrical system may supply power to devices such as the ECU, the data acquisition system, the air intake and exhaust system, etc.

In some embodiments, the air intake and exhaust system may be configured to replenish the test engine with air and provide an exhaust passage. The air intake and exhaust system may provide sufficient fresh air to the test engine for combustion to generate power and export the combustion exhaust gases in a timely manner to prevent the effects of harmful gases or cause environmental pollution.

In some embodiments, the air intake and exhaust system may include the air intake device and the exhaust device. The intake device may include an air filter, an intake manifold, an intake valve mechanism, etc. The exhaust device may include an exhaust manifold, an exhaust pipe, a catalytic converter, etc.

In some embodiments, the accelerated mission test platform may further include a circulating water cooling system, a compressed air source, and an industrial video inspection device.

The circulating water cooling system may be used to cool the eddy current dynamometer, keep the working temperature of the eddy current dynamometer below the specified value, and monitor the temperature, pressure, and other parameters to protect the working environment of the eddy current dynamometer.

The compressed air source is an auxiliary equipment for test that may be used to blow air into the engine during abnormal stopping test to dissipate heat.

An industrial video inspection device may be used to monitor various structures in the test workshop (e.g., engines and other important parts) to facilitate the observation of the interior of the test workshop in the operation room.

In some embodiments, the processor may generate an exhaust regulation instruction to control the air intake and exhaust system.

In some embodiments, the processor may obtain test plan information, determine at least one set of candidate exhaust parameters of the air intake and exhaust system based on the test plan information; obtain test environment information in the test workshop; obtain target exhaust parameters based on the test environment information and the at least one set of the candidate exhaust parameters; generate an exhaust regulation instruction based on the target exhaust parameters, send the exhaust regulation instruction to the air intake and exhaust system, and configure the working parameters of the air intake and exhaust system based on the exhaust regulation instruction.

The test plan information is a plan for the test in a future time period and related information. In some embodiments, the test plan information may include a planned test duration, a planned engine setup power, and a planned test item. For example, the test item may include items such as acceleration, braking, etc. In some embodiments, the test plan information may also include the number of test cycles.

An exhaust parameter is a parameter that controls an air intake and exhaust system. In some embodiments, the exhaust parameter may include an intake parameter for controlling an intake device and an exhaust parameter for controlling an exhaust device.

In some embodiments, the intake parameters may include an inlet air volume, an inlet flow rate, an inlet pressure, etc. The exhaust parameters may include an exhaust air volume, an exhaust flow rate, etc.

The candidate exhaust parameters are exhaust parameters that are candidates. In some embodiments, the candidate exhaust parameters may include at least one set of the candidate exhaust parameters, and each set of the candidate exhaust parameters may include candidate intake parameters and candidate exhaust parameters.

In some embodiments, the processor may determine an exhaust parameter range based on the test plan information and randomly generate at least one set of the candidate exhaust parameters within the exhaust parameter range. The exhaust parameter range is a range consisting of an upper limit and a lower limit that may be set for each exhaust parameter.

For example only, if the engine is set to be a higher power in the test plan, the engine may heat up too high, and then a larger intake volume and higher intake pressure may be required to meet the engine's needs to ensure workshop safety. The larger intake volume and higher intake pressure prevent excessive temperature and excessive exhaust gases (e.g., carbon monoxide) from the engine. At this time, the processor may set the lower limit of the exhaust parameter range of intake and exhaust airflow, intake and exhaust flow rate, and intake pressure higher. In some embodiments, the lower limit of the exhaust parameter range may be determined by presetting an exhaust range table. For example, the preset exhaust range table may include the engine power and the corresponding lower limit of the exhaust parameter range.

The upper limit of the exhaust parameter range may be determined in a variety of ways. For example, it may be obtained based on experience. As another example, an upper limit of the exhaust parameter range may be determined based on the lower limit of the exhaust parameter range and the range size of the exhaust parameter range. The range size of the exhaust parameter range may be preset by a human or by the system.

The test environment information is the environment data of the engine being tested in the test workshop. In some embodiments, the test environment information may include temperature, humidity, atmospheric pressure, dust content, etc.

In some embodiments, the test environment information may be obtained by a temperature sensor, a humidity sensor, an atmospheric pressure sensor, a dust content detector, etc.

The target exhaust parameter is the finalized exhaust parameter. The target exhaust parameter may be selected from at least one set of the candidate exhaust parameters.

In some embodiments, the processor may find matching historical environmental information based on the test environment information, and then select, based on the historical exhaust parameters under the historical environmental information, a set of candidate exhaust parameters with the highest similarity among at least one set of candidate exhaust parameters as the target exhaust parameters.

In some embodiments, the processor may determine, via a scoring model, an exhaust score corresponding to each of at least one set of the candidate exhaust parameters. In some embodiments, the processor may select the set of the candidate exhaust parameters with the highest exhaust score as the target exhaust parameters.

The exhaust score is a score that comprehensively evaluates a set of the candidate exhaust parameters. For example, the exhaust score may be set to a value between 0 and 100.

In some embodiments, the scoring model is a machine learning model. In some embodiments, the scoring model may be a machine learning model with a custom structure. The scoring model may also be a machine learning model of other structures, such as a neural network model, or the like.

In some embodiments, inputs to the scoring model may include at least one set of the candidate exhaust parameters, the test plan information, a historical health index sequence, the test environment information, test workshop structure data, fuel data, and outside air data, and outputs may include the exhaust scores corresponding to each set of the candidate exhaust parameters in the at least one set of the candidate exhaust parameters.

Figure 11:
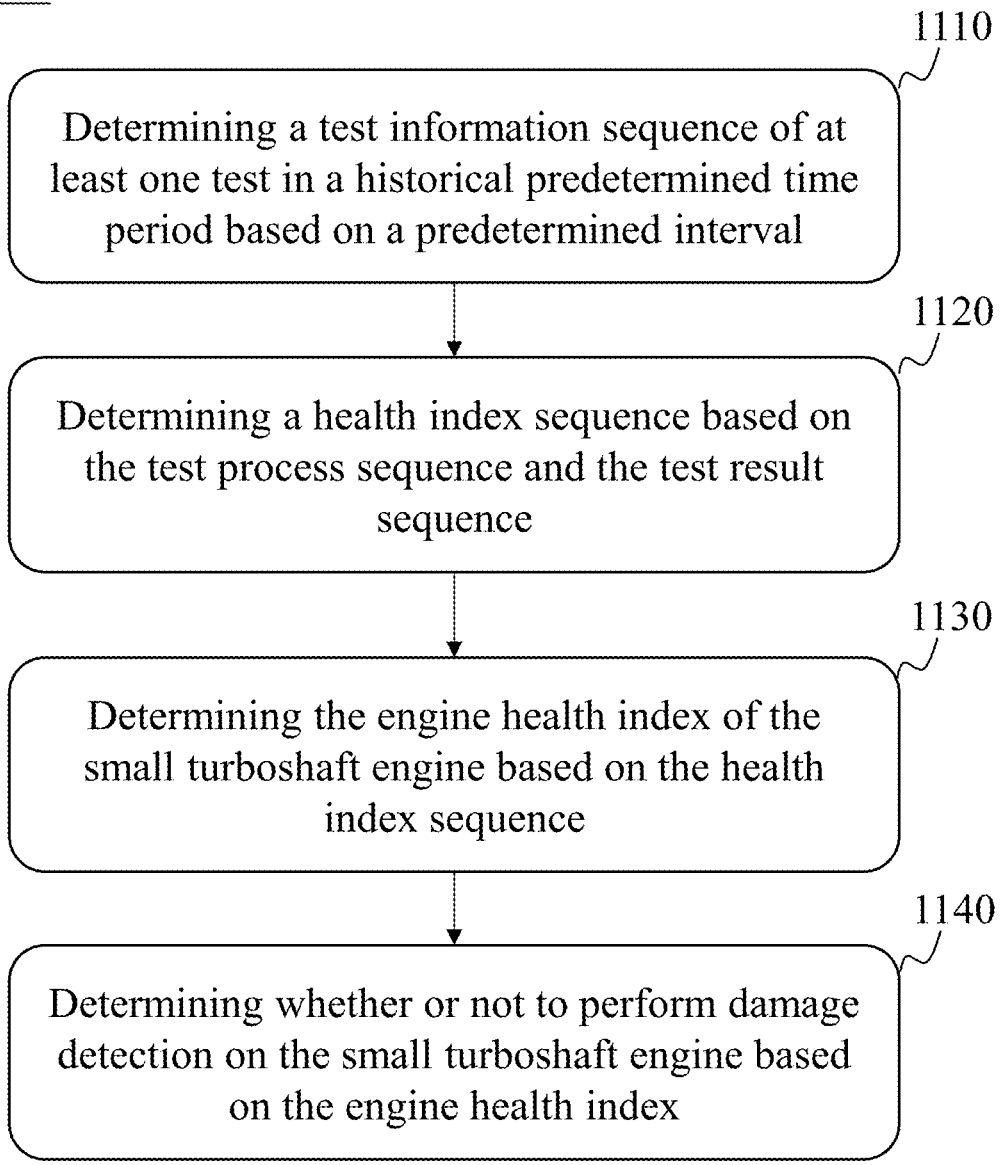
FIG. 11 is an exemplary flowchart illustrating a process of determining whether or not to perform damage detection according to some embodiments of the present disclosure.

More contents on the historical health index sequence may be found in FIG. 11 and the related description. The test workshop structure data may include workshop area dimension, shape, space size, installation locations of intake and exhaust ports of the exhaust system, etc. The fuel data is the type of fuel used in the engine, fuel characteristics, etc. The fuel data affects the situation of the generated exhaust gas. The outside air data may include conditions such as the ambient temperature, humidity, and barometric pressure of the external environment of the test workshop. The outside air data also needs to be considered because the air is fed from the external environment of the test workshop. The fuel data and the test workshop structure data may be entered manually. The outside air data may be obtained from temperature sensors, humidity sensors, atmospheric pressure, dust content detectors, etc. set up outside the test workshop.

In some embodiments, the scoring model may be obtained by training based on a plurality of first training samples with first labels. The first training samples may be obtained from historical data. In some embodiments, the first training sample may include sample candidate exhaust parameters, sample test plan information, sample historical health index sequences, sample test environment data, sample test workshop structure data, sample fuel data, and sample outside air data. The first label may be an exhaust score for a future period of time of the historical moment corresponding to the sample candidate exhaust parameters in the first training samples.

For example, for each set of the sample candidate exhaust parameters, actual work may be performed under sample conditions and actual measurements of workshop temperatures, engine temperatures, and exhaust gas content are performed. The exhaust gas content may include the total amount of carbon monoxide, carbon dioxide, nitrogen oxides, etc., produced by engine operation. The processor may determine the first label based on the actual measured workshop temperature, engine temperature, and exhaust gas content. For example, the first label may be determined by equation (1):

$$E=100-(K_1 \times A + K_2 \times B + K_3 \times C + K_4 \times D) \qquad (1)$$

Where E denotes the first label, i.e., the exhaust score for a future period of time of the historical moment corresponding to the sample candidate exhaust parameters, A denotes the workshop temperature, B denotes the engine temperature, C denotes the exhaust gas content, and D denotes the energy consumption of the air intake and exhaust system. The energy consumption of the air intake and exhaust system is the electrical energy consumed by the air intake and exhaust system per unit of time during operation. $K_1$, $K_2$, $K_3$, $K_4$ are preset coefficients.

It can be understood that the lower the workshop temperature, the lower the exhaust gas content, and the lower the energy consumption of the air intake and exhaust system, the higher the exhaust score. However, when the intake and exhaust air volume, intake and exhaust flow rate, and intake pressure is greater, although it helps air circulation and cooling, the corresponding air intake and exhaust system requires greater operating parameters, and the energy consumption is greater.

In some embodiments of the present disclosure, determining the exhaust score by the scoring model can be performed by utilizing the self-learning capability of a machine learning model to find a law from a large amount of historical data and obtain the relationship among the candidate exhaust parameters, the test plan information, the historical health index sequences, the test environment information, the test workshop structure data, the fuel data, the outside air data, and the exhaust score corresponding to the candidate exhaust parameters, which improves the accuracy and efficiency of determining the exhaust score.

In some embodiments, the processor may also determine target exhaust parameters by a predetermined algorithm and the scoring model. In some embodiments, the predetermined algorithm may include the following operations S1-S6.

Operation S1, defining the parameter space, i.e., the exhaust parameter range described above.

Operation S2, initializing the particle swarm. The processor may set the number of particles as N, for example, N=100, which means 100 particles. Each particle represents a set of the candidate exhaust parameters. The processor may set the parameter dimension of particles as d, for example, d may be the intake and exhaust air volume, intake and exhaust flow rate, and intake pressure. The processor may set the particle position matrix as $X \in R^{N \times d}$, where each row in the matrix represents the position of a particle, i.e. a set of candidate exhaust parameters. The processor may also set the initial position of the particle to be a random position and set the initial velocity of the particle to be a random velocity.

Operation S3, evaluating the fitness of each particle. For each particle i, the processor may input the position $X_i$ of the particle i as a candidate exhaust parameter into a pre-trained scoring model and use the exhaust score output by the scoring model as the fitness $F_i$ of the particle.

Operation S4, determining an individual best position and a global best position for each particle. For each particle i, the processor may also record the best position of the particle in the history, i.e., the position with the highest exhaust score. The processor may also record the best position within the entire particle population, i.e., the position where all particles in the population reach the highest exhaust score in history.

Operation S5, updating the velocity and position of the particle. The processor may update the velocity and position of the particles based on the individual best position and the global best position of the particles.

For example only, for each particle i and dimension j, the processor may update the velocity of the particle according to formula (2):

$$V_{ij}(t+1) = \omega \times V_{ij}(t) + c_1 \times r_1 \times (\text{Pbest}_{ij} - X_{ij}(t)) + c_2 \times r_2 \times (\text{Gbest}_j - X_{ij}(t)) \qquad (2)$$

Where $V_{ij}(t+1)$ denotes the velocity of particle i in the jth dimension of the search space at the next time point t+1. $X_{ij}(t)$ denotes the position of particle i in the j th dimension at the current time point t. ω denotes the inertia weight, which may be used to control the degree which the particle maintains its original velocity and balances the ability to search globally and locally. $c_1$ and $c_2$ are acceleration constants, representing the trust degree the particle in its own experience and the population experience, respectively. $c_1$ and $c_2$ may be used to regulate the speed at which the particle moves toward the historical best position of the particle and the historical best position of the population, respectively. $r_1$ and $r_2$ are random numbers in the interval [0,1] that are used to introduce randomness and help the particle escape from the local optimal solution. $\text{Pbest}_{ij}$ denotes the value of the best historical best position of particle i in the jth dimension. $\text{Gbest}_j$ denotes the value of the best historical position of the population in the jth dimension.

For example only, for each particle i and dimension j, the processor may update the position of the particle according to formula (3):

$$X_{ij}(t+1) = X_{ij}(t) + V_{ij}(t+1)) \qquad (3)$$

Where $X_{ij}(t+1)$ denotes the position of particle i in the jth dimension at the next time point t+1. $X_{ij}$ (t) denotes the position of particle i in the jth dimension at the current time point t. $V_{ij}$ (t+1) denotes the velocity of particle i in the jth dimension at the current time point t.

Operation S6, repeating the above steps S3-S5 iteratively until the iteration end condition is satisfied. For example, the iteration end condition may include reaching a maximum number of iterations, convergence of the fitness value, or an obtained exhaust score greater than a predetermined threshold. The preset threshold may be set or adjusted artificially.

Operation S7, outputting the target exhaust parameters. The processor may output the global best position Gbest of the particle swarm as the optimal set of candidate exhaust parameters, namely the target exhaust parameters.

Exhaust regulating instructions are instructions used to control the operating parameters of the exhaust system.

In some embodiments, due to the certain difference between the corresponding values that the air intake and exhaust system of the test workshop are capable of reaching and the values in the target exhaust parameters (including the intake and exhaust air volume, the intake and exhaust flow rate, and the intake pressure), the processor may determine the corresponding values that the air intake and exhaust system in the test workshop are capable of reaching according to the target exhaust parameters, thereby generating the exhaust regulating instructions. The generated exhaust regulating instructions may be sent down to the air intake and exhaust system in the test workshop for execution.

In some embodiments, the processor may dynamically adjust the operating parameters of the air intake and exhaust system during a single test process.

In the actual process, various factors may influence the preset exhaust parameters in the exhaust regulating instructions, resulting in the desired effect not being achieved. At this time, the operating parameters of the air intake and exhaust system may be dynamically adjusted. The preset operating parameters in the exhaust regulation instructions are adjusted in advance to prevent untimely adjustments in actual work.

In some embodiments, in response to satisfying a predetermined condition, the processor may increase an operating parameter of the exhaust system. For example, increasing one or more of an intake air volume, an intake flow rate, an intake pressure, an exhaust air volume, an exhaust flow rate, etc. In some embodiments, the predetermined conditions may include any one or more of a test workshop temperature higher than a first temperature threshold, an engine temperature higher than a second temperature threshold, or an exhaust gas volume in the air of the test workshop higher than an exhaust gas volume threshold. If the values of the above three data higher than the corresponding thresholds are more, the greater the increase in the operating parameters. The first temperature threshold, the second temperature threshold, and the exhaust gas threshold may be preset by historical experience.

In some embodiments, in response to not meeting a predetermined condition, the processor may temporarily withhold processing.

In embodiments of the present disclosure, by dynamically adjusting the operating parameters of the exhaust system, the operating effectiveness of the exhaust system can be ensured.

In some embodiments, the processor may also configure the acquisition parameters of the data acquisition system based on the structural damage monitoring means.

In some embodiments, the processor may determine acquisition parameters of the data acquisition system based on the number of monitoring methods involved in the structural damage monitoring means; generate acquisition regulation instructions based on the acquisition parameters; and send the acquisition regulation instructions to the data acquisition system to control the operating parameters of the data acquisition system.

Acquisition parameters are the operating parameters of the data acquisition system when acquiring data. In some embodiments, the acquisition parameter may include an acquisition frequency.

More content about the monitoring methods in the structural damage monitoring means may be found in FIG. 1 and its related description. Understandably, the greater the number of the employed monitoring methods, the larger the data base required, at this time, the monitoring frequency of the data acquisition system may be increased. That is, the greater the number of monitoring methods, the greater the acquisition frequency.

Acquisition regulation instructions are instructions used to control the operating parameters of the data acquisition system. In some embodiments, the processor may generate acquisition regulation instructions that include an acquisition parameter (e.g., an acquisition frequency) based on the acquisition parameter. The generated acquisition regulation instructions may be sent to the data acquisition system in the test workshop for execution.

In embodiments of the present disclosure, determining the acquisition parameters by the number of monitoring methods allows for obtaining the desired acquisition data at a more appropriate acquisition frequency depending on the situation.

FIG. 11 is an exemplary flowchart illustrating a process of determining whether or not to perform damage detection according to some embodiments of the present disclosure. In some embodiments, a process 1100 is executed by a processor.

As shown in FIG. 11, the process 1100 includes the following operations.

Operation 1110, determining a test information sequence of at least one test in a historical predetermined time period based on a predetermined interval, the test information sequence including a test process sequence and a test result sequence.

The predetermined interval is the number of tests between the current determination of the engine health index and the previous determination of the engine health index. For example, the processor may set the predetermined interval as 0, which means that the engine health index needs to be calculated once after each test. The engine health index is a numerical value that characterizes the overall health condition of the engine.

In some embodiments, the predetermined interval is negatively correlated with the number of historical tests and positively correlated with the current engine health index. The processor may determine the predetermined interval by looking up a predetermined intervals table based on a combination of parameters including the number of historical tests and the engine health index. The predetermined interval table may include correspondences between different parameter combinations and different predetermined intervals.

Understandably, the higher the number of historical tests, the lower the engine health index, and the closer the engine is to component damage. At this time, the predetermined intervals may be shortened so that the engine health index is calculated more frequently.

The historical predetermined time period is the time period from the previous damage detection to the current time.

The test information sequence is an information sequence indicating the test situation. In some embodiments, and the test information sequence may include a test process sequence and a test result sequence.

The test process sequence is a sequence consisting of test process information corresponding to each test in at least one trial in the historical predetermined time period. The interval between two adjacent tests in the at least one test is a predetermined interval. In some embodiments, the test process information may include the actual collected exhaust parameters of the test experiment, the length of the test, the engine set power, the test item, or the like. For example, the test items may include items such as acceleration, braking, etc. More content on exhaust parameters may be found in FIG. 7 and its related description.

The test result sequence is a sequence consisting of test result information corresponding to each test in at least one test in the historical predetermined time period. In some embodiments, the test result information may include engine performance parameters and vibration conditions, the performance parameters including the gas turbine speed, the exhaust temperature, the fuel flow, and the fuel remaining amount; the vibration conditions including the vibration displacement, the vibration acceleration, and the decibels.

For example, if the preset interval is set as 0 and the time of the previous damage detection is 9:00, the first test is completed and the first set of test information is acquired at 9:10, and the first set of test information includes the test process information 1 and the test result information 1. At this time, the historical preset time period is from 9:00 a.m. to 9:10 a.m., and the test information sequence corresponding to the historical preset time period includes only the first set of test information. If the preset interval is set as 1, the first set of test information is acquired when the first test is completed at 9:10, the second test is completed at 9:20 and the second set of test information is acquired, and the second set of test information includes test process information 2 and the test result information 2. At this time, the historical preset time period is from 9:00 a.m. to 9:20 a.m., and the test information sequence corresponding to the historical preset time period includes the first set of test information and the second set of test information.

It should be noted that a plurality of tests may be included within a historical preset time period, and thus a historical preset time period may include a plurality of the corresponding test process sequences and test result sequences. In other words, a historical preset time period may include a plurality of sub-history time periods, a sub-history time period may include one or more tests, and a sub-history time period may correspond to a set of the test process sequences and the test result sequences. For example, if 10 tests are conducted during a historical preset time period, each or every two tests may correspond to a sub-history time period and a set of the test process sequences and the test result sequences.

In some embodiments, the processor may obtain a test information sequence from historical data.

Operation 1120, determining a health index sequence based on the test process sequence and the test result sequence.

A health index sequence is a sequence composed of the corresponding component health indices of each component in the test engine. For example, a sequence including health indices of components including one or more of a compressor blade, a compressor rotor, a turbine blade (e.g., a turbine blade of a gas turbine, a turbine blade of a power turbine, etc.), a turbine rotor (e.g., a turbine rotor of a gas turbine, a turbine rotor of a power turbine, etc.), a combustion chamber, a gearbox, bearings, and a drive shaft.

In some embodiments, the processor may determine a health index sequence based on the test process sequence and the test result sequence by means of the health index determination model.

In some embodiments, the health index determination model is a machine learning model. In some embodiments, the health index determination model may be a machine learning model with a custom structure. The health index determination model may also be a machine learning model with other structures, such as a neural network model, a recurrent neural network model or the like.

In some embodiments, inputs to the health index determination model may include the historical health index sequence, the test process sequence, the test result sequence, test equipment parameters, the fuel data, and lubrication data, and outputs may include the health index sequence.

The pre-measured health index sequence is the health index sequence composed of the health indices of the components that have been obtained in the historical preset time period. In other words, it is a health index sequence including the health indices of the components that have been determined in the sub-history periods preceding the current sub-history period in the historical preset time period. For example, if it is necessary to determine the health index sequence corresponding to the third sub-history time period, the third sub-history time period is the current sub-history time period, and the pre-measured health index sequence is a sequence composed of the health indices corresponding to the first sub-history time period and the health indices corresponding to the second sub-history time period.

The test equipment parameters are the parameters of the components of the test engine. The fuel data is the type of fuel, additives, and pollutant content. The lubrication data refers to the chemical composition of the lubricant, metal chip content, moisture, etc. The test equipment parameters, the fuel data, and the lubrication data may be obtained in advance by measurement.

In some embodiments, the test equipment parameters may include geometric dimensions, design parameters, thermal performance parameters, and material data for each component. In some embodiments, the geometric dimensions may include diameter, thickness, length, shape, and surface finish of the component. In some embodiments, the design parameters may include the geometric angle of the blades, the compression ratio, the combustion chamber volume, the number of turbine stages, etc. In some embodiments, the thermal performance parameters may include thermal conductivity, the coefficient of thermal expansion, or the like. In some embodiments, the material data may include the type of alloying elements of the material and the ratio of alloying elements of the material, etc.

In some embodiments, the health index determination model may be obtained by training based on a plurality of second training samples with a second label. The second training samples may be obtained in historical data, which is a collection of samples containing a plurality of subsamples. In some embodiments, each of the subsamples of the second training samples may include a sample pre-tested health index sequence of a sample engine, a sample test process sequence, a sample test result sequence, sample test equipment parameters, the sample fuel data, and sample lubrication data. The second label may be an actual health index sequence corresponding to the subsample. The second label may be determined by systematic or human labeling. For example, after each test, the sample engine may be disassembled and actual damage to the sample engine may be detected to obtain the component health index (e.g., using one or more of the damage monitoring methods described in the present disclosure). For example, the more severe damage to the certain component, the lower the corresponding component health index. In some embodiments, operations such as fluorescent penetrant testing, or monitoring such as CT scanning, etc., may be performed on each component to test for deformation, internal defects, etc., to determine the corresponding component health index.

In some embodiments, the processor may obtain the second training samples and the corresponding second labels and input the second training samples into an initial health index determination model to perform one or more rounds of iterations. In each round of iterations, the processor may select one or more subsamples from the second training samples, input the one or more subsamples into the initial health index determination model, obtain the outputs corresponding to the one or more subsamples from the initial health index determination model; the processor may calculate a value of the loss function via a predefined loss function based on the outputs corresponding to the one or more subsamples and the second labels corresponding to the one or more subsamples; the processor may inversely update the parameters of the initial health index determination model based on the value of the loss function in a variety of ways, e.g., updating the model parameters based on the gradient descent manner. When the iteration end condition is satisfied, the processor may end the iteration to obtain a trained health index determination model.

According to some embodiments of the present disclosure, determining a health index sequence by the health index determination model may utilize the self-learning capability of a machine learning model to find a law from a large amount of historical data, obtain the relationship between the pre-test health index sequence, the test process sequence, the test result sequence, the test equipment parameters, the fuel data, and the lubrication data, and the health index sequence, etc., which improves the accuracy and efficiency of determining the health index sequence.

In some embodiments, the processor may categorize the subsamples in the second training samples based on the number of tests, and then determine a plurality of sample types, each of which may include a plurality of the subsamples, the proportionate number of samples in each sample type is not less than a predetermined number threshold. For example, the subsamples with the number of tests in a first range may be classified into one sample type, the subsamples with the number of tests in a second range may be classified into another sample type, and so on, to obtain the plurality of sample types. The first range, the second range, or the like may be preset by the system or by a human.

The number of tests included in the subsample may indicate the length of the test time, which means that sequence data with different lengths of running time may be processed by the model, so as to be able to learn the change patterns of the engine health state over shorter or longer time spans. It is necessary for capturing both rapidly changing situation (e.g., sudden failures) and slowly evolving trends (e.g., gradually accumulating damage). In some embodiments, the processor may utilize subsample sets of different sample types for batch training. For example, at least one round of iterative training may be performed based on the subsample sets of one of the sample types, then at least one round of iterative training is performed based on the subsample sets from the other sample type until an iteration end condition is met.

In some embodiments, a predetermined number threshold for the number of samples per sample type is positively correlated with the number of tests. Longer sequence data may provide a more detailed running history, which helps the model learn more complex laws of health state evolution, thereby improving the accuracy of prediction.

As an example only, assuming that 100 samples are needed, the samples may be categorized based on the number of historical tests performed on samples. 0 to 5 times are categorized into the first type, and 5 to 10 times are categorized into the second type, because the number of historical tests of the second type is greater than the first type, it is necessary to set the preset number threshold of the second type greater than the preset number threshold of the first type. That is, more samples corresponding to the second type need to be collected.

According to some embodiments of the present disclosure, longer test history may provide more information about the evolution of the engine health state. For example, the samples in the second type may contain engine operation data over a longer time span, helping the model learn more complex change patterns. By increasing the number of samples with more tests, a balanced distribution of samples may be maintained in the second training sample, ensuring that the model is not lean towards the samples with fewer tests while ignoring the subtle changes that may occur in cases with a higher number of tests.

Step 1130, determining the engine health index of the small turboshaft engine based on the health index sequence.

The engine health index is a value that characterizes the overall health of an engine.

In some embodiments, the processor may perform a weighted average or a weighted sum of the component health indices in the health index sequence to determine the engine health index. The weights of the component health indices for each component may be positively correlated to the importance degree of the component. For example, if the gas turbine has a greater importance degree than the blades, the weight of the component health index for the gas turbine may be greater than the weight of the component health index for the blades. The importance degree of the components may be determined by a professional assessment in advance.

Step 1140, determining whether or not to perform damage detection on the small turboshaft engine based on the engine health index.

In some embodiments, a single damage detection may be performed when decrease of the engine health index obtained from two adjacent times reaches a predetermined decrease value. In some embodiments, one damage detection may also be performed when the engine health index is decreased below a predetermined threshold. The predetermined decrease value and the predetermined threshold may be determined manually.

Since the engine needs to inhale air for combustion during operation, however, different air compositions affect the engine to different degrees. For example, for air with a high dust content, it is easy to cause damage to engine components. Therefore, the test environment information also needs to be considered. More contents on the test environment information may be found in FIG. 7 and its related description.

In some embodiments, the processor may determine a predetermined threshold or a predetermined value based on the test environment information; and determine whether or not to perform damage detection based on the predetermined threshold or predetermined value and the engine health index.

In some embodiments, the processor may construct an environmental feature vector based on the test environment data, the average engine intake volume, and the average engine exhaust volume, and determine the environmental impact degree based on the environmental feature vector and a vector database. The environmental impact degree characterizes the impact degree of the environment on the damage of the engine components. Environmental feature vector is a vector that characterizes the environmental situation.

The vector database may include a plurality of reference environmental feature vectors and a plurality of reference environmental impact degrees, the reference environmental feature vectors corresponding to the reference environmental impact degrees. The reference environmental feature vectors are constructed in the same manner as the environmental feature vectors.

In some embodiments, the processor may conduct experiments under conditions of a test environment, engine intake volume, and engine exhaust volume corresponding to the reference environmental feature vector to obtain the impact degree of the reference environment corresponding to the reference environmental feature vector.

In some embodiments, operation of the engine may be performed under conditions corresponding to the reference environmental feature vector. For example, the operating environment, the average engine intake volume, and the average engine exhaust volume are controlled according to the conditions of the reference environmental feature vector. Conditions other than the conditions of the reference environmental feature vector may be controlled at a normal operating level. After running for a preset period of time, the engine may be inspected, including inspection of the average impurity content in the engine exhaust, inspection of the impurity residue amount/wear in the intake system, inspection of the impurity residue amount/wear in the combustion chamber, etc. The larger these detected parameters, the greater the impact degree of the reference environment corresponding to the reference environment feature vector.

In some embodiments, a predetermined threshold or a predetermined decrease value may be determined based on the environmental impact degree. The predetermined decrease value may be used to determine whether to perform damage detection by the decrease magnitude of the engine health index from two adjacent acquisitions. The preset threshold may be used to determine whether to perform damage detection by the engine health index. The preset threshold is positively correlated with the environmental impact degree, and the preset decrease value is negatively correlated with the environmental impact degree. In some embodiments, the specific value of the preset threshold or preset decrease value may be determined by looking up a threshold table. The threshold table may be determined based on historical experience. The threshold table may include a correspondence between the environmental impact degree and a predetermined threshold or a predetermined decrease value.

In embodiments of the present disclosure, determining whether or not to perform damage detection in conjunction with the test environment data can make the determination results more accurate.

In embodiments of the present disclosure, determining whether or not to perform damage detection by determining an engine health index allows for a more flexible approach to reasonable arrange the frequency and timing of damage monitoring, without adding unnecessary costs too frequent or missing critical damage signals due to inadequately monitoring.

It should be noted that the foregoing description of the operation 1100 is intended to be exemplary and illustrative only and does not limit the application scope of the present disclosure. For those skilled in the art, various corrections and changes to the process may be made under the guidance of the present disclosure. However, these corrections and changes still fall within the scope of the present disclosure.

One or more embodiments of the present disclosure further provide a device for structural damage monitoring for a whole-machine life test of a small turboshaft engine. The device includes at least one processor and at least one memory; the at least one memory is used for storing computer instructions; the at least one processor is used for executing at least a portion of the computer instructions to implement the method for structural damage monitoring for a whole-machine life test of a small turboshaft engine as described in any of the embodiments of the present disclosure.

One or more embodiments of the present disclosure further provide a non-transitory computer-readable storage medium, the storage medium storing computer instructions. When the computer reads the computer instructions in the storage medium, the computer performs a method for structural damage monitoring for a whole-machine life test of a small turboshaft engine as described in any of the embodiments of the present disclosure.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure, such as "an embodiment", "the embodiment", and/or "some embodiments" means a feature, structure, or characteristic associated with at least one embodiment of the present disclosure. Accordingly, it should be emphasized and noted that two or more references to "one embodiment" or "an embodiment" or "an alternative embodiment" at different places in the present disclosure do not necessarily refer to the same embodiment. In addition, certain features, structures, or characteristics of one or more embodiments of the present disclosure may be suitably combined.

Additionally, unless expressly stated in the claims, the order of the processing elements and sequences, the use of numerical letters, or the use of other names as described in the present disclosure are not intended to qualify the order of the processes and methods of the present disclosure. While some embodiments of the invention that are currently considered useful are discussed in the foregoing disclosure by way of various examples, it is to be understood that such detail serves only an illustrative purpose, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers describing the number of components and attributes, and it should be understood that such numbers used in the description of embodiments are modified in some examples by the modifiers "approximately", "nearly", or "substantially." Unless otherwise noted, the terms "about," "approximately," or "nearly" indicate that ±20% of variation in the stated number is allowed. Correspondingly, in some embodiments, the numerical parameters used in the present disclosure and claims are approximations, which may change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as practicable.

For each patent, patent application, patent application disclosure, and other material cited in the present disclosure, such as articles, books, manuals, publications, documents, etc., the entire contents of which are hereby incorporated by reference herein. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for structural damage monitoring for a whole-machine life test of a small turboshaft engine, comprising:
    determining a failure mode based on a load borne by typical components of the small turboshaft engine in a service process and common failure forms, the common failure forms including blade fatigue fracture and blade elongation;
    screening a structural damage index of a non-major component based on a coupling relationship between structural damages, the structural damage index of the non-major component representing a current health status of the small turboshaft engine;
    selecting a destructive damage of components in the small turboshaft engine and an indirect damage causing changes in material properties of a key component;
    planning a structural damage monitoring means based on the failure mode, the structural damage index of the non-major component, the destructive damage, and the indirect damage;
    designing an accelerated mission test platform of the small turboshaft engine, and designing a torque automatic loading scheme of an eddy current dynamometer based on properties of the eddy-current dynamometer of the accelerated mission test platform and the small turboshaft engine as an experimental carrier; and
    testing the small turboshaft engine, and performing damage monitoring of the small turboshaft engine based on the planned structural damage monitoring means.

2. The method of claim 1, wherein the failure mode includes blade radial elongation, fatigue fracture, reverse torsion, pitting, ablation, and surface roughness change caused by load, thermal shock, surface particle erosion.

3. The method of claim 1, wherein the screening of the structural damage index of the non-major component depends on whether the structural damage is coupled with a creep deformation of a gas turbine, the structural damage index includes a structural damage of a gas turbine combustion chamber, a structural damage of a gas turbine guide, and a structural damage of the power turbine that affects a working condition of the gas turbine.

4. The method of claim 3, wherein
    the destructive damage includes a crack length of the gas turbine, a crack length of the gas turbine guide, a crack length of the main combustion control of the gas turbine combustion chamber, and a blade creep elongation of the power turbine;
    the indirect damage includes a blade ablation degree of the gas turbine, a blade surface roughness of the gas turbine, an ablation degree of the gas turbine guide, an ablation degree of the main combustion control of the gas turbine combustion chamber, and a surrounding surface roughness of the main combustion control of the gas turbine combustion chamber.

5. The method of claim 4, wherein the structural damage monitoring means includes:
    for cracks produced in the service process, using a fluorescent penetration detection technology to detect surface opening defect;
    using a CT scanning technology to detect internal defects of components;
    using a radial clearance measurement, a three-dimensional scanning, and a three-dimensional coordinate method to detect a blade creep deformation of the gas turbine;
    using a microscope to observe pitting and ablative damage of a gas turbine blade caused by high temperature and high pressure environment; and
    for the surface roughness, complexing a to-be-measured surface first by using complex gel, and then detecting a roughness of the complexed observable surface.

6. The method of claim 5, wherein the accelerated mission test platform comprises a test workshop and an engine fuel system, a control system, a data acquisition system, a test bench, an eddy current dynamometer, an electrical system, and an air intake and exhaust system arranged in the test workshop;
    the engine fuel system is configured to provide fuel for a test engine;
    the control system is configured to control the test engine;
    the data acquisition system is configured to collect and record test parameters;
    the test bench is configured to mount the test engine;
    the eddy current dynamometer is configured to absorb and measure a shaft power output of the test engine, and the eddy current dynamometer has a function of load adjustment;

the electrical system is configured to supply power to each system in the test workshop; and the air intake and exhaust system is configured to supply air to the test engine and provide an exhaust channel.

7. The method of claim 6, wherein the data acquisition system includes a performance parameter monitoring system and a health monitoring system, the performance parameter monitoring system is configured to measure performance parameters and monitor the measured performance parameters, the performance parameters including a gas turbine speed, an exhaust temperature, a fuel flow, and a fuel remaining amount; and the health monitoring system is configured to detect a vibration condition and monitor health status of the test engine through the detected vibration condition, the vibration condition including vibration displacement, vibration acceleration, and decibel.

8. The method of claim 1, wherein the torque automatic loading scheme of the eddy current dynamometer includes:

setting a torque loading mode of the eddy current dynamometer to a constant speed mode, setting a maximum speed of an output shaft of the small turboshaft engine and a maximum speed of the eddy current dynamometer, and completing an independent adjustment of loading torque through a negative feedback adjustment.

* * * * *